(12) United States Patent
Tan et al.

(10) Patent No.: US 10,375,585 B2
(45) Date of Patent: Aug. 6, 2019

(54) SYSTEM AND METHOD FOR DEEP LEARNING AND WIRELESS NETWORK OPTIMIZATION USING DEEP LEARNING

(71) Applicant: Futurewei Technologies, Inc., Plano, TX (US)

(72) Inventors: Yongxi Tan, Hillsborough, NJ (US); Jin Yang, Bridgewater, NJ (US); Qitao Song, Shanghai (CN); Yunjun Chen, Shenzhen (CN); Zhangxiang Ye, Shanghai (CN)

(73) Assignee: Futurwei Technologies, Inc., Plano, TX (US)

( * ) Notice: Subject to any disclaimer, the term of this patent is extended or adjusted under 35 U.S.C. 154(b) by 201 days.

(21) Appl. No.: 15/643,266

(22) Filed: Jul. 6, 2017

(65) Prior Publication Data
US 2019/0014488 A1    Jan. 10, 2019

(51) Int. Cl.
*H04W 24/02* (2009.01)
*G06N 3/08* (2006.01)

(52) U.S. Cl.
CPC .............. *H04W 24/02* (2013.01); *G06N 3/08* (2013.01)

(58) Field of Classification Search
CPC ...... H04W 24/02; H04W 28/16; G06N 20/00; G06N 3/08
USPC ...... 455/67.11, 418, 424, 446; 370/235, 329
See application file for complete search history.

(56) References Cited

U.S. PATENT DOCUMENTS

| 2013/0031036 A1 | 1/2013 | Kojima |
| 2013/0122885 A1 | 5/2013 | Kojima |
| 2018/0376390 A1* | 12/2018 | Gemelos ........... H04W 36/0094 |

FOREIGN PATENT DOCUMENTS

| CN | 103548375 A | 1/2014 |
| CN | 104618149 A | 5/2015 |
| WO | 2007036003 A1 | 4/2007 |
| WO | 2012072445 A1 | 6/2012 |

OTHER PUBLICATIONS

Mnih et al., "Asynchronous Methods for Deep Reinforcement Learning," Google DeepMind, Jun. 16, 2016, 19 pages, arXiv:1602.01783v2 [cs.LG]. Montreal Institute for Learning Algorighms (MILA), University of Montreal.
Hasselt, Hado van et al., "Deep Reinforcement Learning with Double Q-learning," Google DeepMind, Dec. 8, 2015, 13 pages, arXiv:1509.06461v3 [cs.LG].

(Continued)

*Primary Examiner* — Sam Bhattacharya
(74) *Attorney, Agent, or Firm* — Slater Matsil, LLP

(57) ABSTRACT

A neural network is trained using deep reinforcement learning (DRL) techniques for adjusting cell parameters of a wireless network by generating a plurality of experience tuples, and updating the neural network based on the generated experience tuples. The trained neural network may be used to select actions to adjust the cell parameters. Each experience tuple includes a cell identifier, a first state, a second state, an action applied to the cell that moves the cell from the first state to the second state, a local reward, and a global reward. The neural network is updated based on whether or not each action is acceptable, which is determined based on the global reward and the local reward associated with each action.

32 Claims, 11 Drawing Sheets

(56) References Cited

OTHER PUBLICATIONS

Wang, Ziyu et al., "Dueling Network Architectures for Deep Reinforcement Learning," Google DeepMind, Jan. 8, 2016, 16 pages, arXiv:1511.06581v2 [cs.LG], London, UK.

Mnih et al., "Human-level control through deep reinforcement learning," Research Letter, Feb. 26, 2015, 13 pages, vol. 518, Macmillan Publishers Limited, doi:10.1038/nature14236.

\* cited by examiner

SYSTEM AND METHOD FOR DEEP LEARNING AND WIRELESS NETWORK OPTIMIZATION USING DEEP LEARNING

CROSS-REFERENCE TO RELATED APPLICATIONS

This application is cross-referenced to U.S. application Ser. No. 15/642,563, entitled "Optimizing Cellular Networks Using Deep Learning", filed concurrently with this application on Jul. 6, 2017, which application is hereby incorporated by reference herein as if reproduced in its entirety.

TECHNICAL FIELD

The present invention relates generally to a wireless communications, and, in particular embodiments, to a system and method for deep learning and wireless network optimization using deep learning.

BACKGROUND

Wireless network optimization techniques are generally used to improve wireless network performance, so as to provide wireless services to network users with improved quality of service and quality of user experience, and also satisfy other service requirements. As the wireless networks increasingly expand and become complex, wireless network optimization is facing challenges to meet higher requirements, such as lower optimization cost, shorter optimization time, higher optimization accuracy, etc., and conventional methods appear to be difficult to meet these requirements.

Artificial intelligence provides techniques that use a machine to mimic human intelligence. Artificial intelligence techniques aim to solve many problems using machines, such as reasoning, planning, learning, natural language processing, perception, moving and manipulating objects, etc. Artificial intelligence techniques have already been used in various applications, such as autonomous vehicles, medical diagnosis, playing games (such as Chess), search engines (such as Google search), online assistants (such as Siri), and image recognition, among many others. Artificial intelligence techniques have also been put into application in the field of telecommunications, e.g., for improving telecommunications services and products.

SUMMARY

Technical advantages are generally achieved, by embodiments of this disclosure which describe a method for deep learning and wireless network optimization using deep learning.

According to one aspect of the present disclosure, there is provided a method that includes: initializing a neural network with a set of weight values, the neural network being used to determine actions that adjust one or more settings of cells associated with base stations in a wireless network, each base station providing communication services to user equipments (UEs) within one or more cells; and training the neural network by using a deep reinforcement learning (DRL) process, the DRL processing comprising generating a first plurality of experience tuples for a plurality of cells in the wireless network, each experience tuple comprising a cell identifier that identifies a cell, a first state of the cell, a second state of the cell, an action that causes the cell to transit from the first state to the second state, and a reward value for taking the action, wherein a state of a cell comprises a setting of a base station providing a coverage area of the cell, and a reward value is calculated using a cost function based on measurement reports received from UEs in the wireless network, wherein each experience tuple can be a DRL-generated experience tuple in which a respective action is selected by a DRL agent based on the neural network according to a DRL technique or an expert-generated experience tuple in which the respective action is provided based on expert experience, and wherein whether an action is selected by the DRL agent based on the neural network or provided based on the expert experience is determined based on a first criterion; and selecting a second plurality of experience tuples from the first plurality of experience tuples; and updating the set of weight values of the neural network according to reward values in the second plurality of experience tuples.

According to another aspect of the present disclosure, there is provided a method that includes: training a neural network for a plurality of cells in a wireless network using a deep reinforcement learning (DRL) process for adjusting one or more cell parameters of cells associated with base stations in the wireless network, each base station providing communication services to user equipments (UEs) within a coverage area of one or more cells, and the neural network being trained to determine actions that can be performed on the base stations, wherein the DRL process comprises: generating a plurality of experience tuples for a plurality of cells in the wireless network, comprising: generating a state tensor for each of the plurality of cells, each state tensor indicating a state of a respective cell, wherein a state of a cell comprises a setting of a base station associated with the cell, the base station providing a coverage area of the cell; selecting an action for each of the plurality of cells, the action moving the respective cell from one state to another state, wherein an action comprises information for adjusting a setting of a base station associated with a cell; applying respective actions selected for the plurality of cells to the respective cells to adjust one or more cell parameters; and generating an experience tuple for each of the plurality of cells based on the respective action applied, the experience tuple comprising a cell identifier identifying the respective cell, a first state of the respective cell that is indicated by a respective state tensor, a second state of the respective cell, the action applied to the respective cell that moves the respective cell from the first state to the second state, a local reward calculated for applying the action to the respective cell, and a global reward calculated for applying the action to the respective cell, the local reward being calculated based on a local cost function and the global reward being calculated based on a global cost function; and determining whether or not an action of a first experience tuple in the plurality of experience tuples corresponding to a first cell is acceptable based on the local reward and the global reward of the first experience tuple; and updating weights of the neural network based on whether or not the action is acceptable. The method also includes selecting an action for adjusting a cell parameter of a cell in the wireless network based on the trained neural network; and instructing to adjust the cell parameter of the cell in the wireless network according to the selected action.

According to yet another aspect of the present disclosure, there is provided an apparatus that includes a non-transitory memory storage comprising instructions and one or more processors in communication with the memory storage. The one or more processors execute the instructions to: train a neural network for a plurality of cells in a wireless network using a deep reinforcement learning (DRL) process for adjusting one or more cell parameters of cells associated with base stations in the wireless network, each base station providing communication services to user equipments (UEs) within a coverage area of one or more cells, and the neural network being trained to determine actions that can be performed on the base stations, wherein the DRL process comprises: generating a plurality of experience tuples for a plurality of cells in the wireless network, comprising: generating a state tensor for each of the plurality of cells, each state tensor indicating a state of the respective cell, wherein a state of a cell comprises a setting of a base station associated with the cell, the base station providing a coverage area of the cell; selecting an action for each of the plurality of cells, the action moving the respective cell from one state to another state, wherein an action comprises information for adjusting a setting of a base station associated with the cell; applying respective actions selected for the plurality of cells to the respective cells to adjust one or more cell parameters; and generating an experience tuple for each of the plurality of cells based on the respective action applied, the experience tuple comprising a cell identifier identifying the respective cell, a first state of the respective cell that is indicated by a respective state tensor, a second state of the respective cell, the action applied to the respective cell that moves the respective cell from the first state to the second state, a local reward calculated for applying the action to the respective cell, and a global reward calculated for applying the action to the respective cell, the local reward being calculated based on a local cost function and the global reward being calculated based on a global cost function; and determining whether or not an action of a first experience tuple in the plurality of experience tuples corresponding to a first cell is acceptable based on the local reward and the global reward of the first experience tuple; and updating weights of the neural network based on whether or not the action is acceptable. The one or more processors also execute the instructions to select an action for adjusting a cell parameter of a cell in the wireless network based on the trained neural network; and instruct to adjust the cell parameter of the cell in the wireless network according to the selected action.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
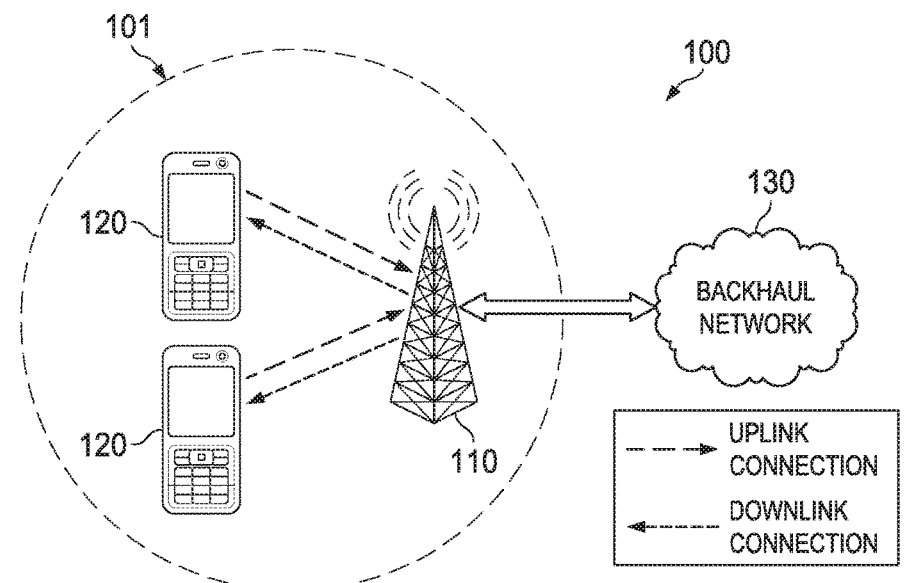
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Embodiments of the present disclosure provide a method for adjusting cell parameters of a wireless network using a deep learning technique. In some embodiments, the method trains a neural network for selecting actions to adjust cell parameters of the wireless network using a deep reinforcement learning (DRL) technique, and adjusts one or more cell parameters of a plurality of cells in the wireless network according to actions that are selected using the trained neural network based on a current state of the wireless network. A cell parameter may be a setting of a base station providing a coverage area of a cell or a setting indicating a relationship between base stations (thus, cells). Examples of a cell parameter may include transmission power, an antenna tilt, an antenna azimuth, transmission power, or a distance between two base stations.

During training of the neural network, a plurality of experience tuples may be generated for a plurality of cells in the wireless network. An experience tuple for a cell includes a cell identifier identifying the cell, a first state of the cell, a second state of the cell, an action applied to the cell that moves the cell from the first state to the second state, a local reward calculated for applying the action to the cell, and a global reward calculated for applying the action to the cell. The first state or the second state may be indicated by a state tensor. A state tensor of a cell may include information about the cell that indicates a state of the cell, such as cell parameters, KPIs, and measurement reports.

In one embodiment of generating an experience tuple of a cell, the method may select an action for the cell at a first state, apply the action to the cell, obtain a second state of the cell after the action is applied, and calculate the local reward and the global reward. The action may be selected using the neural network according a DRL algorithm. In some embodiments, the action may also be selected based on expert experience, instead of using the neural network. The expert experience may include expert experience data, historical data, and/or other data that has been obtained and may be used for help selecting an action in training a neural network. The local reward may be calculated based on a local cost function, and the global reward may be calculated based on a global cost function. The local reward and the global reward may be calculated using information from different cells in the wireless network.

The method may then update weights of the neural network based on the generated plurality of experience tuples. In some embodiments, the method may determine whether each action of the plurality of experience tuples is acceptable, and apply a positive or negative gradient to the neural network based on whether the action is acceptable. In one embodiment, an action may be acceptable when a global reward associated with the action satisfies a first criterion and a local reward associated with the action satisfies a second criterion. In another embodiment, an action may not be acceptable when the global reward associated with the action does not satisfies the first criterion or when the local reward associated with the action does not satisfies the second criterion.

The embodiments of the present disclosure also provide a method for training a neural network using a DRL technique. In some embodiments, the method initializes the neural network with a set of weight values that may be randomly selected or obtained from an expert neural network, and generates a plurality of experience tuples for updating the weights of the neural network. Each experience tuple may include a first state of an environment, a second state of the environment, an action that causes the environment to transit from the first state to the second state, and a reward value for taking the action. In some embodiments, each experience tuple may be a DRL-generated experience tuple in which a respective action is selected by a DRL agent using the neural network according to a DRL technique, or an expert-generated experience tuple in which the respective action is provided based on expert experience. This method may be referred to as a supervised DRL method. The method may be used in training a neural network for adjusting cell parameters of a wireless network.

FIG. 1 illustrates a network 100 for wirelessly communicating data. The network 100 comprises a base station no having a coverage area (or a cell) 101, a plurality of mobile devices 120, and a backhaul network 130. As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
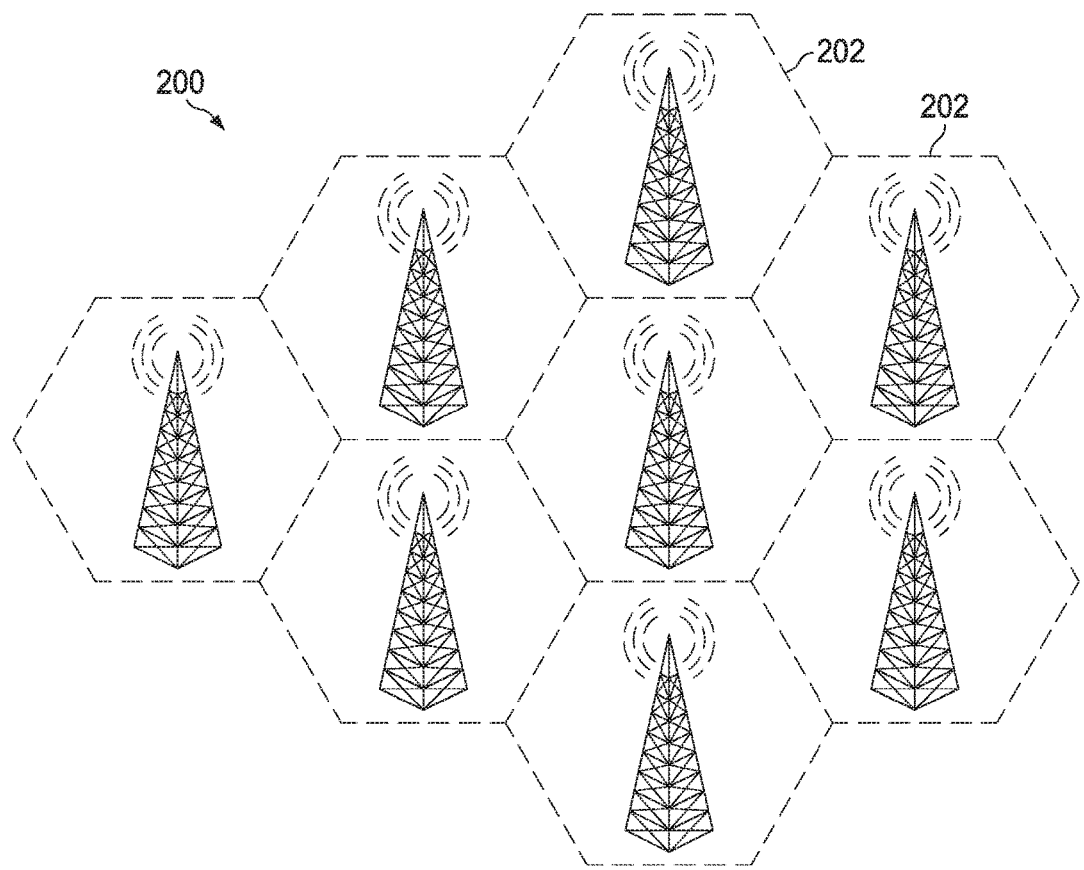
FIG. 2 illustrates a diagram of an embodiment cellular network.

A cellular network may include a number of base stations forming a number of interconnected cells. Through an arrangement of the base stations, the cellular network can provide wireless communication coverage over a large geographical area, and enable wireless communication devices to communicate with other devices anywhere in the network. FIG. 2 illustrates a cellular network 200 including a plurality of base stations (BSs) providing coverage of cells 202. Each cell represents a geographical area. The area covered by the cells 202 may not overlap each other, or there may be some or substantial overlap of cells 202. FIG. 2 shows each cell has a hexagon shape and each base station is located in the center of a cell. In another example, each base station may be located in a corner of a hexagon and providing coverage of three hexagon-shaped cells (or three-sectored cells). The cellular network 200 may have a certain layout or topology, which includes the relative distance between base stations and their antenna angular directions relative to each other. The cellular network shown in FIG. 2 is by way of example only and may vary in further embodiments.

Optimization techniques may be applied to the cellular network 200 to improve performance of the cellular network 200 with respect to one or more cellular system parameters or a performance goal. For example, optimization of the cellular network 200 may include optimization for mobility robustness, load balancing, coverage and capacity, power savings, interference reduction, or adjustment and optimization of other key performance indicators (KPIs). The cellular system parameters may include antenna electronic tilt (eTilt), antenna azimuth, and antenna mechanical tilt (mTilt), and transmission power.

In the cellular network 200, neighboring cells 202 may affect each other such that a change in settings of one base station associated with one cell may affect performance, such as coverage and capacity, of a neighboring cell. For example, changing a setting of one base station to improve its cell coverage and capacity may create interference with other neighboring cells and potentially decrease the coverage and capacity of those neighboring cells, as well as the coverage and capacity of the overall network. Increasing the number of cells in the cellular network may result in an exponential increase in the number of interactions, relationships and potential interference between neighboring cells. Thus, performance of a cellular network may be affected not only by each individual cell, but also relationship between the cells, and optimization of the cellular network needs to consider these affecting factors.

Various optimization techniques have been used to optimize wireless network. For example, a virtual simulation or model of a cellular network can be constructed to enable variation and optimization of network parameters in a virtual environment. In another example, network parameters are optimized iteratively by making small step adjustments and gathering real-world feedback on the effects of those adjustments on a real network until an optimal adjustment action is found. These techniques, however, generally require knowledge of UE locations, accurate engineer parameters, and costly drive tests and site visiting, and are generally time-consuming. Moreover, even when an optimal solution is found for one cellular network, the solution is generally not applicable to a different cellular network. Rather, optimization for a new cellular network would require starting an optimization process all over again from scratch. In addition, these techniques are not able to satisfy a so-called one-shot optimization requirement, where one or more network parameters only need to be adjusted once, rather than multiple times, to optimize a network.

Embodiments of the present disclosure provide methods for optimizing a plurality of cells in a wireless network using deep learning techniques. The embodiments may be applied to wireless network optimizations with respect to various optimization objectives, including, but not limited to, automatic neighbor relation (ANR), automated configuration of physical cell identity (ACPCI), mobility robustness optimization (MRO), mobility load balancing (MLB), coverage and capacity optimization (CCO), energy savings, interference reduction, RACH optimization, inter-cell interference coordination (ICIC), calibration of inaccurate engineer parameters, cell labeling, identification of cells or area to be optimized or adjusted, cell outage detection (COD), cell outage compensation (COC), and optimization or adjustment of any other KPIs of a wireless network. Optimizing the plurality of cells may include adjusting various cell or network parameters to meet an optimization goal. While embodiments of the present disclosure are described with respect to a cellular network, it is understood that the embodiments may also be applied to cellular networks and other types of wireless communications networks, such as a Wi-Fi network, body area sensor network, Internet-of-Things, cognitive radio network, and communication network for smart grid.

Deep learning is a technique that is developed in the field of artificial intelligence, where a learning agent interacts with an environment by receiving an observation that characterizes a current state of the environment, selecting an action to be performed using a deep learning network in response to receiving the observation, and performing an action on the environment. The deep learning network is configured to receive an observation and to process the observation to generate or determine a next action to be performed based on the observation. The deep learning network is trained in a deep learning process to improve its intelligence for effectively selecting an action. The training of a deep learning network may be referred to as a deep learning method or process. The deep learning network may be neural network, a Q-learning network, dueling network, or any other applicable network.

Figure 3:
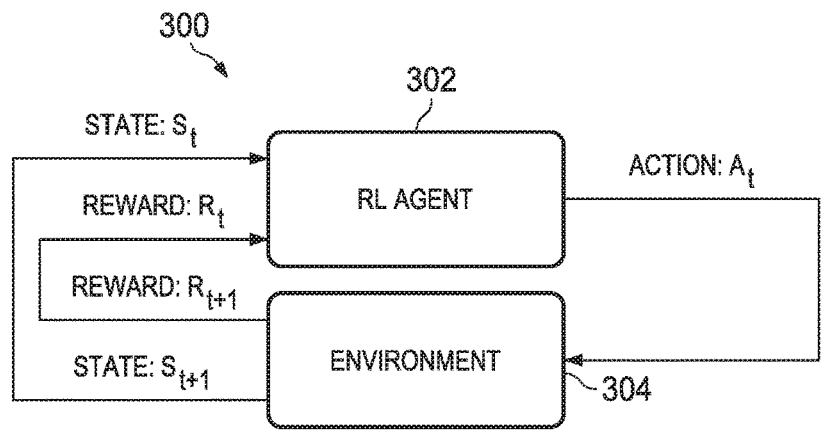
FIG. 3 illustrates a schematic diagram of an embodiment reinforcement learning (RL) system.

FIG. 3 illustrates a schematic diagram of a reinforcement learning (RL) system 300. The RL system 300 in this example may be a deep reinforcement learning (DRL) system, where a deep neural network is used. The RL system 300 may also use other learning networks, such as a deep Q-network. The RL system 300 uses a RL agent 302 that interacts with an environment 304 to take a sequence of actions (A) in order to maximize a cumulative reward (R). The RL agent 302 may be implemented by an algorithm, or a control unit/module. The environment 304 may be a wireless network including a plurality of cells, or a simulator simulating a wireless network. An observation of the environment 304 may be a state of a wireless network, which may include states of one or more of a plurality of cells in the network. As shown, the RL agent 302 takes as input a state ($S_t$) of the environment and a reward ($R_t$), and selects an action to perform on the environment. In some embodiments, the action may refer to an adjustment of a cell parameter of a cell associated with a base station. A cell parameter herein refers to a setting of a base station with respect to a particular cell for wireless communications. Examples of a cell parameter may include antenna transmission power, an antenna tilt, an antenna height, an antenna azimuth, a handover parameter (e.g., hysteresis, time-to-trigger), a vertical or horizontal direction of an element of antenna array of massive multi-input multi-output (MIMO). A cell parameter may also include settings indicating relationship between base stations, such as a distance between two base stations (e.g., inter-site-distance). In a case of one base station providing three-sectored cells, the base station may configure a set of parameters for each of the cells for wireless transmissions. Those of ordinary skill in the art would recognize that the embodiment methods in this disclosure may be applied to adjust various cell parameters.

Embodiments of this disclosure in the following are described with respect to cells. One of ordinary skills in the art would understand that a cell is a physical area that is provided by a base station, and thus, actions taken to a cell refers to actions taken to a base station that provides a coverage area of the cell. For example, adjusting a cell parameter of a cell refers to adjusting a setting of a base station that provides coverage of the cell, and selecting an action for adjusting a cell or adjusting a cell parameter of a cell refers to selecting an action for adjusting a setting of a base station that provides coverage of the cell. In another example, applying an action to a cell refers to adjusting a base station setting according to the action. Description of the embodiments with respect to cells should not be construed to be limiting to the scope and spirit of the present disclosure.

The selected action, when performed on the environment 304, causes the environment 304 to move or transit from the state ($S_t$) to a new state ($S_{t+1}$). The reward ($R_t$) is associated with the state ($S_t$) and a previous action that moves the environment 304 to the state ($S_t$). A reward may be calculated according to a predefined cost function that indicates an objective for adjusting or optimizing the environment 304. A reward indicates whether an action contributes positively or negatively for moving the environment from one state to another state with respect to the cost function. After the action is applied to the environment, a reward ($R_{t+1}$) for taking the action to move the environment to the new state ($S_{t+1}$) is then calculated. The new state ($S_{t+1}$) and the reward ($R_{t+1}$) are then sent to the RL agent 302, based on which the RL agent 302 selects a new action to be applied to the environment.

The RL system 300 may begin with a first state of the environment. The RL agent 302 may select a sequence of actions, and apply the actions to the environment 304. In some embodiments, the RL agent 302 may select some actions randomly or according to a predefined rule or criterion. In other embodiments, the RL agent 302 may determine an action to take using a learning network, such as a neural network. By applying the sequence of actions, a plurality of experience tuples ($S_t$, $R_t$, $A_t$, $S_{t+1}$, $R_{t+1}$) is generated. Each experience tuple represents an experience, and includes a first state ($S_t$) of the environment, a second state ($S_{t+1}$) of the environment, an action ($A_t$) that causes the environment to transit from the first state ($S_t$) to the second state ($S_{t+1}$), and a first reward value ($R_t$) associated with a previous action that has transited the environment to the first state ($S_t$), and a second reward value ($R_{t+1}$) associated with the action ($A_t$). The experience tuples indicate actions that move the environment from state to states, may indicate what sequence of actions that can moves the environment towards an expected state. In case of a neural network is used for action selection, the experience tuples may be used to adjust weight values of neural network, whereby the neural network is trained for selecting actions for the environment 304. When the RL system 300 is a DRL system, a deep neural network is used as a function approximator to select an action, i.e., $f(S_t, R_t) \rightarrow A_t$.

Figure 4:
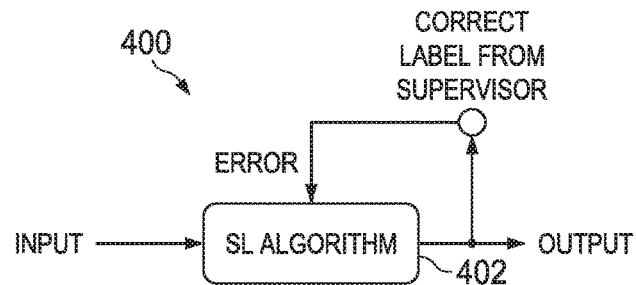
FIG. 4 illustrates a schematic diagram of an embodiment supervised learning (SL) system.

The RL system 300 does not generate labeled input (S) and output (A) pairs, such as a labeled state (St) and action ($A_t$) pair, compared with a supervised learning (SL) system. FIG. 4 illustrates a schematic diagram of a SL system 400, where a SL algorithm 402 receives an input (X), such as training data, and generates an output (Y). Correctly labeled input (X) and output (Y) pairs are then generated by a supervisor, and an estimated error is fed back to the SL algorithm 402, which is used to adjust the generation of the output.

In some embodiments, deep learning techniques may be used to solve complicated decision making problems in wireless network optimization. For example, deep learning networks may be trained to adjust one or more parameters of a wireless network, or a plurality of cells in the wireless network, so as to achieve optimization of the wireless network with respect to an optimization goal.

Figure 5:
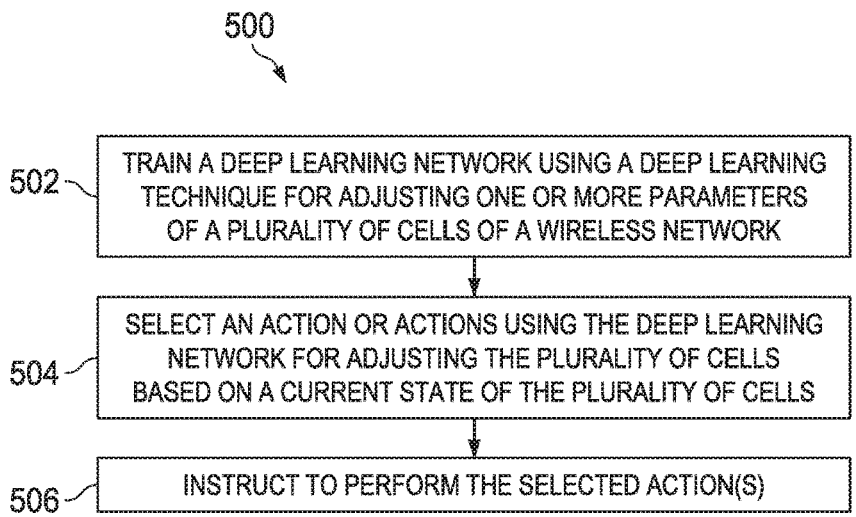
FIG. 5 illustrates a flowchart of an embodiment method for wireless network optimization using deep reinforcement learning (DRL)

FIG. 5 illustrates a flowchart of an embodiment method 500 for wireless network optimization using deep reinforcement learning (DRL). At step 502, the method 500 trains a deep learning network using a DRL technique for adjusting one or more parameters of a plurality of cells in a wireless network. In some embodiments, the method 500 may receive state information of the plurality of cells, select actions using the deep learning network for adjusting one or more of the plurality of cells, calculate reward values for the actions selected and taken, and update weight values of the deep learning network according to the reward values. The method 500 may train the deep learning network on a simulator. The method 500 may also train the deep learning network in real time during operations of the wireless network. At step 504, once the deep learning network has been trained, the method 500 may select an action or actions using the deep learning network for adjusting the plurality of cells based on a current state of the plurality of cells. At step 506, the method 500 instructs to perform the selected action(s).

Conventional DRL techniques typically require a large amount of experience tuples (e.g., more than 100 M experience tuples) to produce a satisfactorily trained neural network. Generating such large amount of experience tuples is generally very time-consuming for wireless communications systems, as a state of a wireless network is determined based on states of cells in the network, which in turn are based on various types of information, such as measurement reports (MRs) and key performance indicators (KPIs). The information takes time to generate and collect. For example, it has been shown that it may take one day for a wireless network to generate a MR and a KPI to be used for generating a single experience. Moreover, a good reward from a random action or an action suggested by a DRL agent according a neural network may be very sparse, and this dramatically slow the training process due to frequent weak reward or stimulation to the neural network. In addition, because the state or optimization space of a wireless communications system is huge, exhaustive exploration is generally impossible. As such, directly using conventional DRL techniques in the embodiment method 500 to train a neural network may take much longer time and may not produce a satisfactory training result.

Various expert methods and algorithms in the field of wireless communications have already been developed and used for optimizing wireless networks with various objectives and for solving various performance problems. Examples of such methods and algorithms include methods or algorithms for radio resource management (RRM) or self-organizing networks (SONs). Thus, enormous expert data or historical data has already been generated regarding various aspects of a wireless network, and extensive experience has been accumulated in operating and managing the wireless network. The data and experience are continuing to be generated everywhere and every day. In the following, "expert experience" will be used to refer to expert experience data, historical data, and/or other data that may be used for help selecting an action in training a neural network. The expert experience may be utilized in training neural networks for wireless network optimization, e.g., by suggesting actions with good rewards based on expert experience. Use of expert experience can help speed up training of the neural network.

Figure 6:
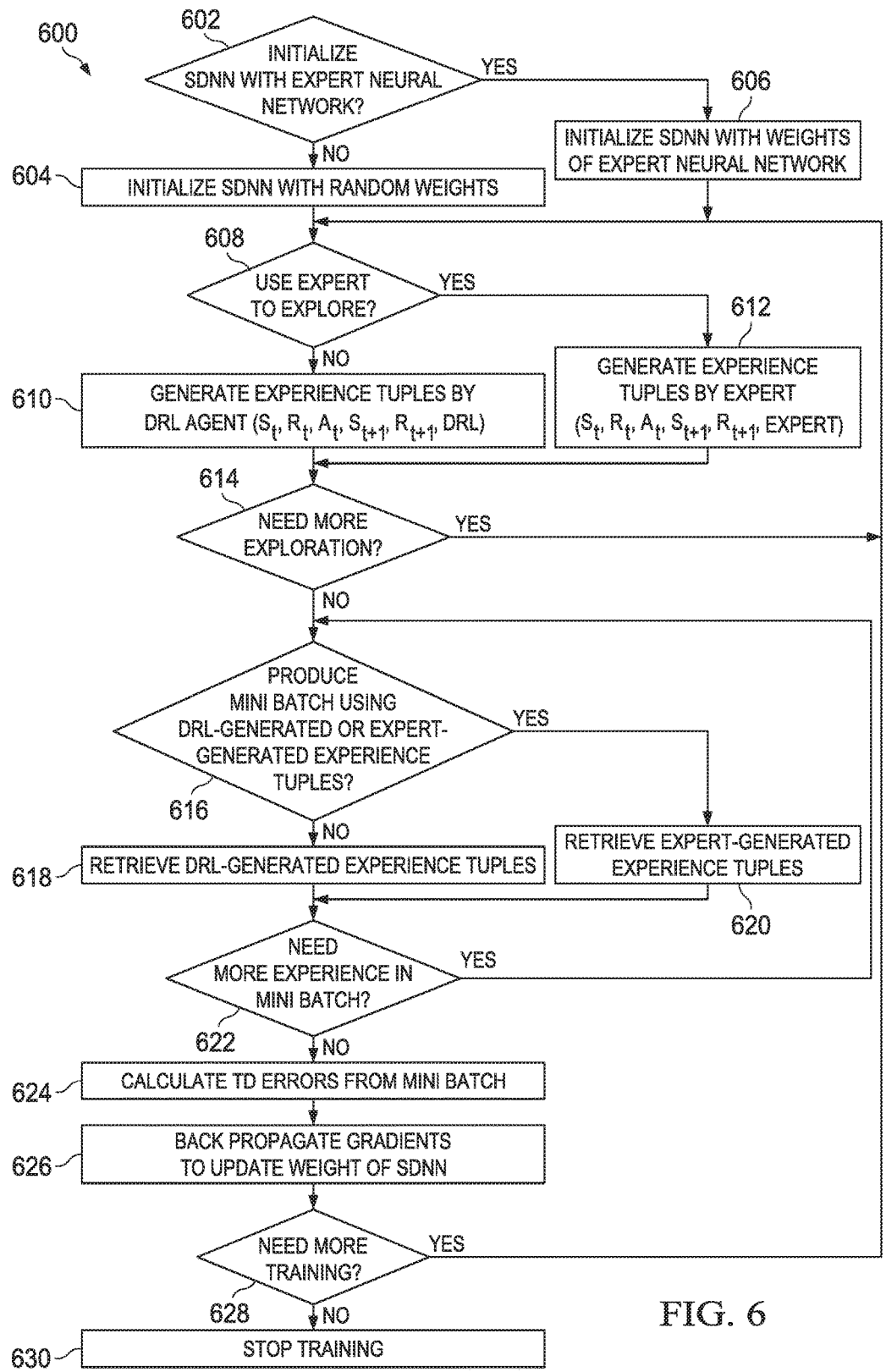
FIG. 6 illustrates a flowchart of another embodiment DRL method.

FIG. 6 illustrates a flowchart of an embodiment DRL method 600. The method 600 may be a computer-implemented method executed with one or more processors. The DRL method 600 may be used to train a neural network in a deep learning process. The embodiment method 600 can be used to train a neural network using various deep learning algorithms, and can be used in solving various optimization problems of wireless networks. The method 600 may be referred to as a supervised DRL method for expert experience can be used to guide the selection of actions in training the neural network. The neural network in this example may be referred as a supervised DRL neural network (SDNN). The neural network may have architecture of a Visual Geometry Group (VGG) network, Residual network (Resnet), Alex Net, Inception Net, Multi-Layer Perceptron (MLP), Long Short Term Memory (LSTM), asynchronous advantage actor-critic (A3C), or any other applicable architecture. The DRL method 600 may start with initializing the neural network with a set of weight values. At step 602, the DRL method 600 determines whether the SDNN is initialized with randomly configured or selected weight values, or with weight values of an expert neural network. The expert neural network may be a neural network that has been trained or configured with weights based on a neural network learning technique and/or expert experience. The expert neural network may be trained using deep learning techniques such as deep supervised learning, deep unsupervised learning, or deep reinforcement learning. The DRL method 600 may determine to proceed to step 604 to use random weight values to initialize the SDNN, or proceed to step 606, where weight values of the expert neural network are used to initialize the SDNN.

When the SDNN is initialized with the set of weight values, the method 600 may generate a plurality experience tuples for training the SDNN. At step 608, the method 600 may determine whether expert is used to explore. That is, the method 600 determines whether experience tuples may be generated by a DRL agent using the SDNN according to a DRL algorithm, or may be generated according to expert experience provided by the expert. In particular, the method 600 may determine whether one or more actions are selected or determined by the DRL agent using the SDNN (an experience tuple generated in this way is referred to as a DRL-generated tuple), or selected or determined by an expert according to expert experience (an experience tuple generated in this way is referred to as an expert-generated tuple). The expert here may refer to an algorithm or another deep learning network, e.g., a learning network that is different than the SDNN trained in this example. The expert may make use of expert experience, such as historical data or pre-existing state-action information, to select an action. It would be more likely to select a good action based on a current state of an environment using the expert experience that is known knowledge, such that the selected action results in a positive reward. Selecting actions using the expert experience helps expedite training of the SDNN.

The method 600 may determine whether or not the expert experience is used to explore, i.e., to generate experience tuples, according to various criteria, such as probability-based criteria, similarity-based criteria, or threshold-based criteria. For example, the method 600 may probabilistically determine whether an experience tuple is to be generated (or an action is selected) by the DRL agent using the SDNN, or generated according to expert experience. The method 600 may make such a determination using, e.g., an e-greedy technique, a simulated annealing technique, or any other applicable probabilistic techniques/approaches. In another example, the method 600 may check whether similar scenario has been explored before by the expert, or a similar action has been tried before by the expert, and then determine whether to select an action by the DRL agent or by the expert. For example, when a similar scenario has been explored before by the expert, the method 600 may have confidence to select, according to the expert experience, an action that has a good reward. In yet another example, the method 600 may pre-determine a threshold, such as a percentage or a number of DRL-generated (or expert-generated) experience tuples, and produce a DRL-generated (or expert-generated) experience tuple when the threshold is exceeded. Those of ordinary skill in the art would recognize many variations, modifications and alternatives to define such a criterion.

The method 600 may add a label to each experience tuple to indicate whether the respective experience tuple is a DRL-generated or expert-generated experience tuple. For example, a DRL-generated experience tuple may be represented by ($S_t$, $R_t$, $A_t$, $S_{t+1}$, $R_{t+1}$, DRL), where "DRL" is a label indicating that this experience tuple is a DRL-generated experience tuple. An expert-generated experience tuple may be represented by ($S_t$, $R_t$, $A_t$, $S_{t+1}$, $R_{t+1}$, Expert), where "Expert" is a label indicating that this experience tuple is an expert-generated experience tuple. Based on the determination at step 608, the method 600 may go to step 610 generating DRL-generated experience tuples, or go to step 612 generating expert-generated experience tuples. In this way, a plurality of experience tuples is generated. The plurality of experience tuples may include only DRL-generated experience tuples, only expert-generated experience tuples, or a combination of DRL-generated experience tuples and expert-generated experience tuples. The generated experience tuples may be saved, e.g., in a database, for later use.

At step 614, the method 600 determines whether it needs more exploration to generate more experience tuples. The method 600 may make the determination based on a criterion. For example, the method 600 may predefine a threshold, such as a number of experience tuples to be generated, or a time period elapsed for generating experience tuples, and make the determination based on whether the threshold is satisfied. Those of ordinary skill in the art would recognize many variations, modifications and alternatives to define such a criterion. When more experience tuples are needed, the method 600 may go back to step 608 to generate more experience tuples. When no more experience tuples are needed, the method 600 may then produce a mini batch of experience tuples, by which weights of the SDNN are updated. The mini batch includes at least a subset of the generated experience tuples. The method 600 may randomly select the subset from the generated experience tuples to produce the mini batch. In some embodiments, the mini batch may only include DRL-generated experience tuples, only expert-generated experience tuples, or a combination of DRL-generated experience tuples and expert-generated experience tuples.

At step 616, the method 600 determines whether DRL-generated or expert-generated experience tuples are selected for the mini batch. The method 600 may make the determination based on a predefined criterion. The criterion may be threshold based, probability based, similarity based, based on relationships between the experience tuples, or based on importance sampling. For example, a threshold, e.g., a number or percentage of DRL-generated or expert-generated experience tuples, may be predefined, and the method determines to select a DRL-generated or expert-generated experience tuple based on whether the threshold is satisfied. In another example, the method boo may probabilistically select a DRL-generated or expert-generated experience tuple. For example, a value between 0 and 1 is randomly generated, e.g., using a random uniform generator. If the value is greater than a threshold, an expert-generated experience tuple is retrieved; and if the value is not greater than the threshold, a DRL-generated experience tuple is retrieved. The determination may also be made based on relationships between the experience tuples. For example, instead of selecting only one experience tuple independently at one time, a group of relevant experience tuples may be selected together each time. The determination may also be made based on other criteria. In one example, an experience tuple may be selected based on its importance to the current training process. The importance of an experience tuple may be defined according to various factors associated with the experience tuple. For example the more a TD error associated with an experience tuple is, the more importance this experience tuple is). In another example, experience tuples may be selected based on similarity to one or more currently selected experience tuples. For example, a probability that an experience tuple is selected may be set to be proportional to its similarity to the currently selected experience tuples, and experience tuples are selected based on their probabilities and the currently selected experience tuples. Those of ordinary skill in the art would recognize many variations, modifications and alternatives to define such a criterion. In some embodiments, the method 600 may select the subset of experience tuples one by one from the generated experience tuples to form the mini batch. For each selection, the method 600 may determine whether a DRL-generated or an expert-generated experience tuple will be selected. When the method 600 determines to use or select a DRL-generated experience tuple, at step 618, the method 600 retrieves a DRL-generated experience tuple, e.g., from a storage or a database of DRL-generated experience tuples. When the method 600 determines to use or select an expert-generated experience tuple, at step 620, the method 600 retrieves an expert-generated experience tuple from the expert, e.g., from a storage or a database of expert-generated experience tuples.

At step 622, the method 600 determines whether the mini batch needs more experience tuples based on a criterion. The criterion may be threshold-based, probability-based, or based on relationship between the experience tuples. For example, when the number of experience tuples in the mini batch is less than a predefined threshold, the method 600 may need to select more experience tuples. If the determination is yes, the method 600 goes back to step 616 to continue select more experience tuples for the mini batch. Otherwise, the method 600 goes to step 624. As another example, when the value generated by a random number generator is greater than a predefined or a dynamic changing probability (e.g., based on cooling schedule defined in simulated annealing), the method 600 may select more experience tuples. In yet another example, when an experience tuple is selected, other experience tuples related to this experience tuple may also be selected.

At step 624, the method 600 calculates a temporal difference (TD) error corresponding to each action of the experience tuples in the mini batch. The TD error may be calculated using a method that is value-based, policy-based or model-based, and may be calculated using any applicable algorithms existed or unforeseen, such as techniques of deep Q-network, Double Q, Dueling network, A3C, Deep Sarsa, N-step Q, etc. At step 626, the method 600 back-propagates gradients calculated according to the TD errors to update weights of the SDNN. The techniques for calculating TD error, gradients, updating weights of a neural network are well-known in the pertinent art and will not be described in detail herein.

At step 628, the method 600 determines whether the SDNN needs more or further training. The method 600 may make the determination based on whether a criterion is satisfied. For example, the method may determine whether the criterion is satisfied based on a predefined threshold. The threshold may be an epoch value, such as a maximum epoch, a gain threshold, or a time threshold. In an example, when the maximum epoch is exceeded, the method 600 may determine that the criterion is satisfied and no more training is needed. In this case, the method 600 goes to step 630 and stops the training of the SDNN. The method 600 may output the trained SDNN. If the criterion is not satisfied, the method 600 goes to step 608 and repeat the steps 608-628 to perform further training.

The embodiment method 600 may dramatically speed up the training of deep learning networks in any DRL algorithms by using expert experience to guide the exploration. Simulation has shown that the number of experience tuples that are needed to be generated for training a neural network has been reduced from 100 M to several millions, and training time can be shortened from 1.2 years to about 5 days. The embodiment method also dramatically improves the intelligence of a DRL agent by supervising the training of the deep learning network with an expert. Actions suggested or selected by the expert generally result in strong and good rewards, which in turn speed up the learning process. Expert experience used for selecting actions also reduces noises or bias caused by weak and sparse rewards resulted from random exploration or exploration by the neural network itself without supervising.

Figure 7:
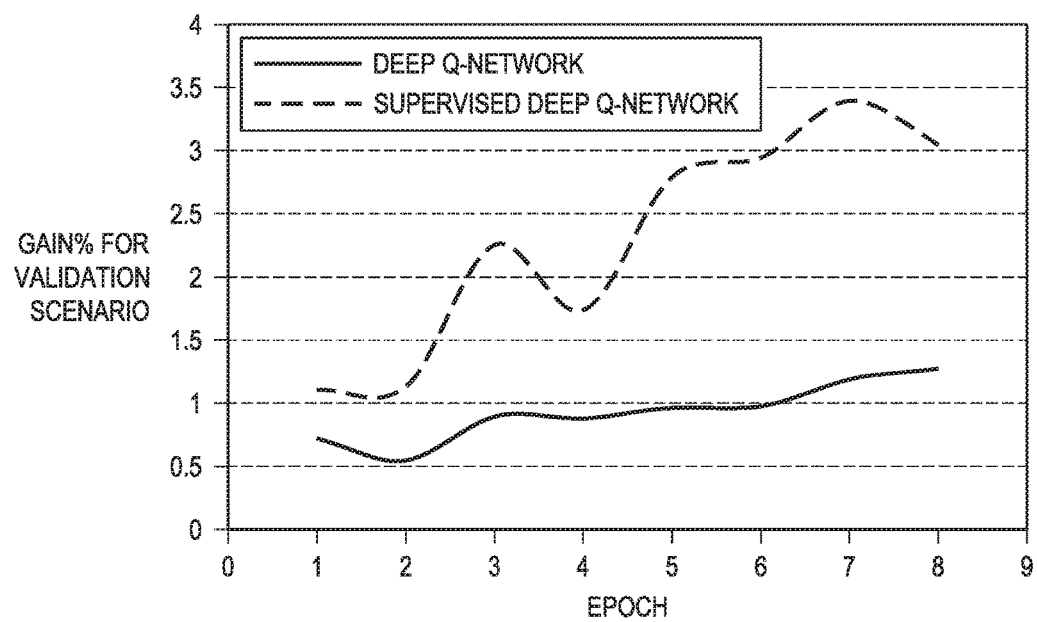
FIG. 7 illustrates a graph showing a gain percentage for validation scenario obtained using a deep Q-network and a supervised deep Q-network.
Figure 8:
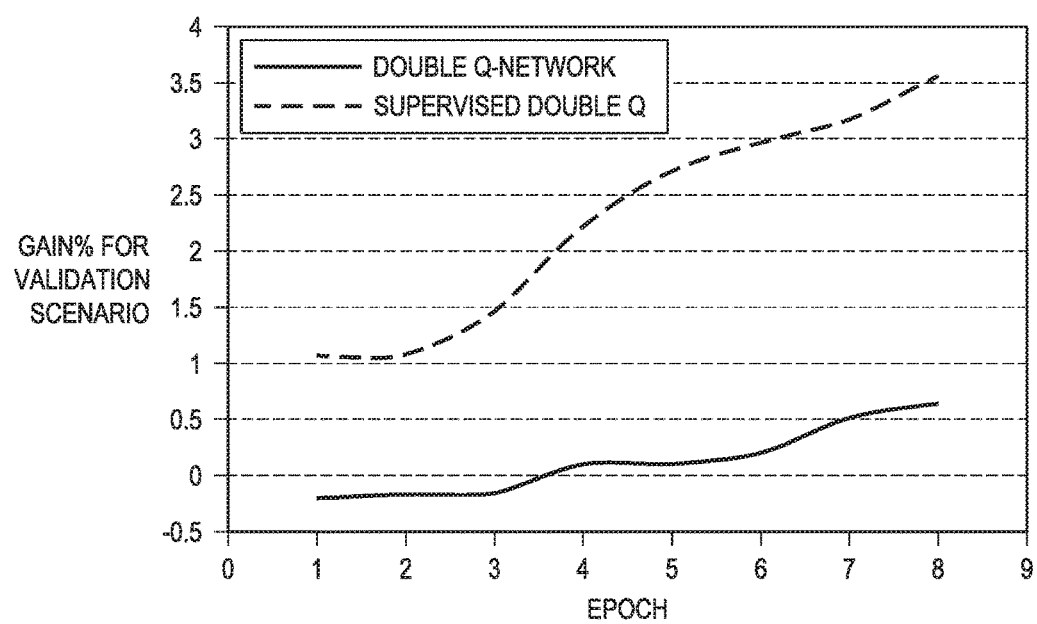
FIG. 8 illustrates a graph showing a gain percentage for validation scenario obtained using a double Q-network and a supervised double Q-network.
Figure 9:
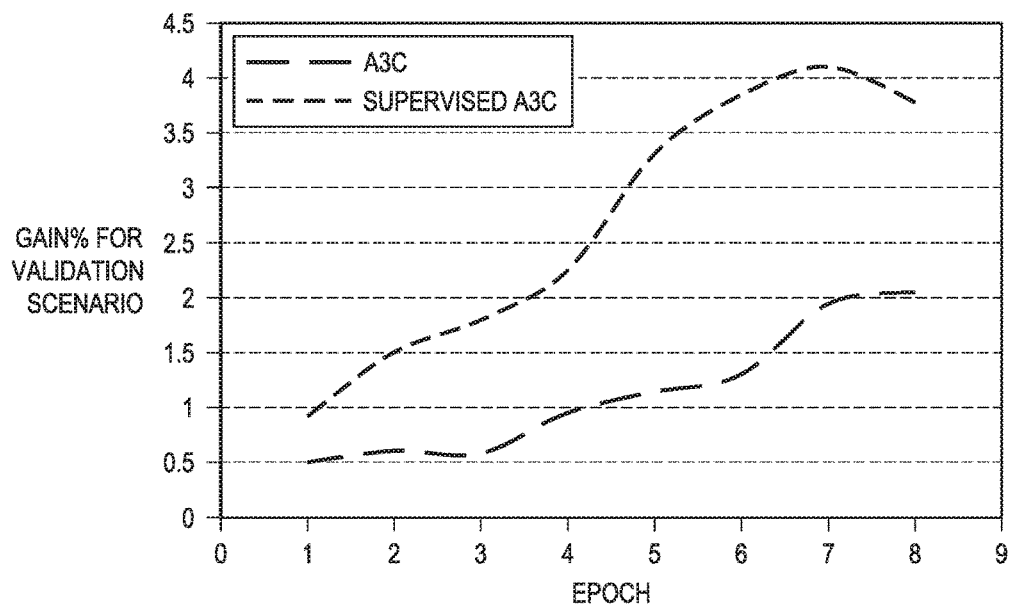
FIG. 9 illustrates a graph showing a gain percentage for validation scenario obtained using A3C and a supervised A3C

The embodiment method may be used to improve the performance and speed of any existing or new DRL algorithms, such as Deep Q-Network, Double Q, Dueling Network, A3C, Deep Sarsa, etc. FIGS. 7-9 illustrate performance of a DRL method supervised by an expert compared with the DRL method without being supervised by the expert. FIG. 7 illustrates a graph showing a gain percentage for validation scenario obtained using a deep Q-network and a supervised deep Q-network. FIG. 8 illustrates a graph showing a gain percentage for validation scenario obtained using a double Q-network and a supervised double Q-network. FIG. 9 illustrates a graph showing a gain percentage for validation scenario obtained using A3C and a supervised A3C. It can be seen, a higher percentage of gain is obtained by using a supervised DRL method.

Figure 10:
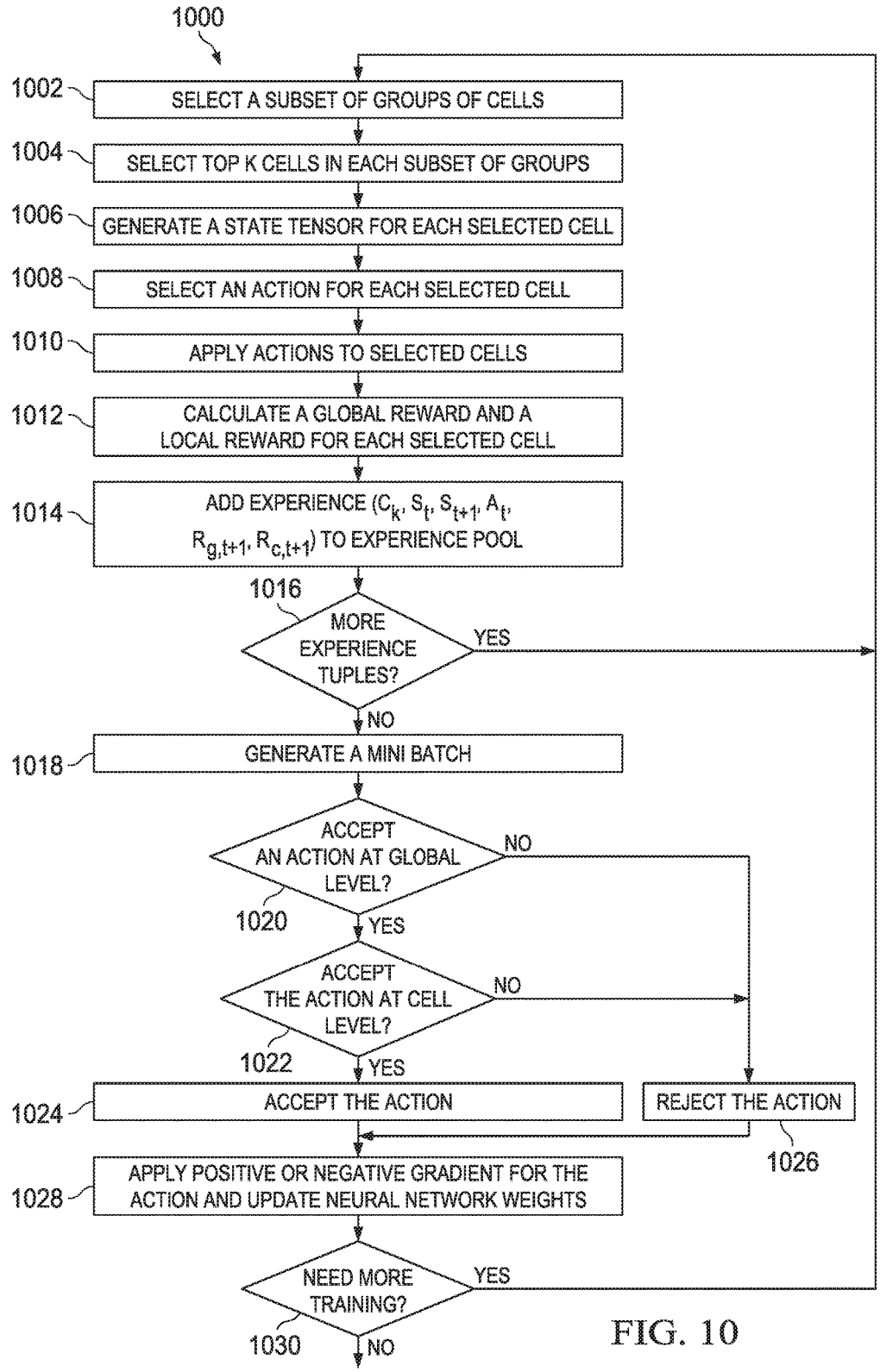
FIG. 10 illustrates a flowchart of yet another embodiment DRL method.

FIG. 10 illustrates a flowchart of another embodiment DRL method 1000 for training a deep learning network in a deep learning process. The deep learning network may be a deep neural network. In this example, the DRL method 1000 trains the deep learning network for adjusting one or more parameters of a plurality of cells in a wireless network. In some embodiments, expert experience may be used during the training process. For example, expert experience may be used as illustrated in the method 600 of FIG. 6, e.g., to initialize the neural network, and help suggest expert actions so as to supervise training of the deep learning network.

In some embodiments, the method 1000 may determine a plurality of cells in the wireless network that are to be adjusted for optimization. The method 1000 may select the plurality of cells according various criteria or rules. In this example, cells in the wireless network are divided into groups, e.g., based on geographical locations or other rules, and cells are selected for optimization based on the groups. As shown, at step 1002, the method 1000 may first select a subset of groups of cells to be optimized in the wireless network. The method 1000 may also select the entirety of the groups of cells for optimization. In some embodiments, the method 1000 may select the subset of groups sequentially so that one group is selected at a time. In other embodiments, the subset of groups may be selected in parallel at the same time. Selecting of the subset may be performed according to a predefined criterion. In some embodiments, selection of the subset of groups may be conducted by sorting the groups of cells in the wireless network based on a first criterion and selecting the subset from the sorted groups based on a second criterion. In one embodiment, the groups of cells may be sorted based on a degree of severity of a problem associated with cells in the groups. The severity of the problem may be determined by constantly monitoring whether various cell measurements exceed a predetermined threshold. Examples of such measurements include KPIs, key quality indicators, or objective functions. In another embodiment, the groups of cells may be sorted according to preference levels or weight values associated with the groups. Then the subset is selected from the sorted groups of cells based on the second criterion. For example, a threshold number of the groups of cells may be selected from the sorted groups. In another example, groups whose values based on the above-mentioned first criteria exceed a predetermined threshold are selected to be optimized. Those of ordinary skill in the art would recognize many variations, modifications and alternatives for selecting a subset of groups of cells in a wireless network for optimization.

At step 1004, the method 1000 selects top K cells from each of the subset of groups that have been selected at step 1002. In this example, the method 1000 performs optimization on the top K cells in each of the subset of groups by adjusting parameters of the top K cells. Step 1004 may be optional, and optimization may be performed on all cells in each selected subset of groups. Selection of the top K cells from each subset of groups may be performed based on a predefined criterion. For example, the top K cells of a group may be selected based on a similar criterion to those discussed above for selecting the subset of groups. Those of ordinary skill in the art would recognize that various methods and/or criteria may be used to select the top K cells.

When the subset of groups and cells in each subset of groups are determined for optimization, the method 1000 starts training of a neural network for adjusting the cells selected in the subset. As discussed above, the method 1000 may initialize the neural network with a set of weights, select a sequence of actions to apply to the selected cells in the subset of groups, generate a plurality of experience tuples, and update the neural network. In some embodiments, the method 1000 may initialize the neural network using steps 602-606 illustrated in method 600 of FIG. 6.

At step 1006, the method 1000 generates a state tensor for each of the top K cells in each of the subset of groups. A state tensor of a cell indicates a state of the cell. A state of a cell may refer to a parameter of the cell, a performance state of the cell, a relationship with other cells, or any combination thereof. The state tensors are generated to be used as input for deep learning. A state tensor of a cell may include any information about the cell and relationships of the cell with other cells. For example, the state tensor may include information, such as cell parameters, KPIs, and measurement reports. The information may be obtained from one or multiple channels. Each channel may provide information regarding one or more features of the cell. Such a state tensor may be referred to as a multi-channel state tensor. Examples of the features include, but is not limited to, cellular network topology (e.g. inter-site distance (ISD), the angular location of cell sites relative to each other, and the height of cell sites), engineer parameters (e.g. azimuth, mTilt, and eTilt), KPIs (e.g. throughput and cell load), and measurement reports from UEs. A measurement report may include information such as reference signal received power (RSRP), reference signal received quality (RSRP), signal interference to noise ratio (SINR), channel quality indicator (CQI)), objective functions, cumulative distribution functions of network performance measures, and interference factor matrices.

A state tensor of a cell may be constructed using the information described above in various structures. In some embodiments, a state tensor may be constructed as a collection of one or more state planes. Each of the state planes may indicate or include information about the cell that is obtained from one or more channels. In some embodiments, a state plane may include a two-dimensional array having a horizontal axis and a vertical axis for storing information of the cell. When constructing a state plane, in one embodiment, the cell may be first placed at the center of the horizontal axis and vertical axis. Neighboring cells of the cell are then ranked according to relationships of the neighboring cells with the cell with respect to the type of information represented by the state plane. The ranking may be based on multiple features and/or types of information obtained from multiple channels. In some embodiments, neighboring cells having a stronger relationship with the cell may be placed closer to the cell in the center of the horizontal axis and the vertical axis. By structuring the information in this way, specifically, to cluster neighboring cells having a stronger relationship closer to the cell, the method facilitates the neural network's processing of input data, i.e., the state tensors, to select actions. In some embodiments, a state tensor may be constructed as a 1D, 2D, 3D or higher dimensional state tensor. For example, a state tensor may be constructed as a single channel matrix. In another example, a group of 3D state tensors may be constructed into a 4D state tensor. Those or ordinary of skill in the art would recognize many variations, modifications and alternatives for constructing a state tensor as used in the embodiments. When the state tensors for the selected cells in the subset of groups are constructed, these state tensors, indicating states of the selected cells, are taken as input into the neural network for selecting next actions for the selected cells.

At step 1008, the method 1000 selects or generates an action by a DRL agent for each of the selected top K cells in each group of the subset of groups. The action is to be performed on the respective cell and changes the state of the respective cell. The method 1000 may randomly select the action, select the action using the neural network based on a DRL algorithm, or select the action based on a policy probability. For example, when the probability of an action is higher than that of any other actions, the method 1000 may select the action that has the highest probability among the actions. The method 1000 may also use an expert to select the action. For example, the method 1000 may determine whether an expert is used to select the action as illustrated in method 600 of FIG. 6, and selects an action to be taken according expert experience.

At step 1010, the method 1000 applies actions generated or selected to the respective cells. As discussed above, an action may be adjusting a cell parameter of the respective cell, or changing a relationship with a neighboring cell. The actions may be applied to a simulator simulating the wireless network. The actions may also be performed on the real cells. At step 1012, the method 1000 calculates a global reward and a local reward for each of the selected cells with an action selected and performed. The global reward and the local reward of a cell are associated with the action applied to the cell. The global reward and the local reward of a cell may vary with the state of the cell, the action applied and/or states of other cells. The global reward and the local reward of a cell may be calculated using a global cost function and a local cost function of the cell, respectively. The global cost function and the local cost function may be configured based on one or more optimization objectives to be achieved, such a targeted KPI, an interference level, an energy level. The global reward and the local reward may be calculated based on information of the cell and other cells in the wireless network, such as information from measurement reports regarding the cell and its neighboring cells.

The global reward may generally represent contribution of the cell, in terms of the global cost function, to the performance of the wireless network at a relatively global level, such as in the whole wireless network, or in the subset of groups selected, in any number of groups of cells in the wireless network, or in the group that the cell belongs to. Similarly, the local reward may generally represent contribution of the cell, in terms of the local cost function, to the performance of the wireless network in a relatively local or cell level, such as in the group that the cell belongs to, in an area including neighboring cells of the cell, or for the cell itself. The global reward and the local reward may be calculated using information from different cells in the wireless network. The information may include measurement reports received by the different cells, KPIs, and other type of information that is applicable for calculating a reward. In some embodiments, a global reward of a cell associated with an action may be calculated using information of all cells in the wireless network, using information of different groups of cells in the wireless network, or using information of any number of cells in the wireless network. In some embodiments, a local reward of a cell associated with an action may be calculated using information of all or some cells in the group that the cell belongs to, using information of neighboring cells of the cell, or only using information of the cell itself. The global rewards and the local rewards for different cells may be calculated using different mechanisms, using information from different number of cells, and using different cost functions and/or cost objectives.

There may be many different ways to define a cost function in terms of a performance or optimization goal. For example, a cost function may be defined for coverage and interference as $f_{cost}=((a*N1)+(1-a)*N2)/N$. a is a coefficient or a weight value, N1 is the number of MRs from UEs whose RSRP of a serving cell is greater than or equal to a RSRP threshold, N2 is the number of MRs received from UEs whose RSRQ of a serving cell is greater than or equal to a RSRQ threshold, and N is the total number of MRs received. The portion of (a*N1) is used to reflect a weight of coverage to the cost function, and the portion (1–a)*N2 reflects a weight of interference to the cost function. An example of the parameters in this cost function may be a=0.5, RSRP threshold=–105, and RSRQ threshold=–10. The interference may also indicated by other information from the MRs, such as RSSINR (reference signal signal-to-interference-plus-noise ratio). In this case, the N2 may be the number of MRs received that include a RSSINR greater than or equal to a RSSINR threshold. For example, the RSSINR threshold may be equal to –3. In different wireless network, the cost function may be defined using different parameters. For example, Ec/Io may be used to measure interference in UMTS, and RSCP used to measure coverage in UMTS. The cost function may also be designed to take into consideration of other factors, such as throughput, CQIs, etc. The cost function may be designed in terms of MRs, KPIs, and/or combination thereof.

In some embodiments, both the global cost function and the local cost function may use the same formula $f_{cost}$ to calculate the global and local reward, such as $f_{cost}=((a*N1)+(1-a)*N2)/N$. However, the global reward and local reward are calculated based on MRs obtained from different cells. The local reward may use MRs received from cells covering a small area and the global reward may use MRs received from cells covering a large area. For example, a local reward of a cell is calculated based on MRs received from UEs served by the cell or served by multiple cells in the same group of the cell within a period of time, while the global reward of the cell is calculated based on MRs received from UEs served by multiple groups of cells or all cells in the wireless network.

By performing steps 1008-1012, the method 1000 can generate an experience tuple for each of the selected cells in the selected subset of groups of cells. Each experience tuple may be represented by Experience ($C_k$, $S_t$, $S_{t+1}$, $A_t$, $R_{g,t+1}$, $R_{c,t+1}$). $C_k$ identifies the cell for which the experience tuple is generated, ($A_t$) represents an action selected and applied to the cell ($C_k$), which transits the cell ($C_k$) from a state ($S_t$) to another state ($S_{t+1}$). ($R_{g,t+1}$) and ($R_{c,t+1}$) represent the global reward and the local reward, respectively, of the cell ($C_k$) corresponding to the action ($A_t$). In some embodiments, each experience tuple may be labeled to indicate whether an experience tuple is generated based on an action selected by using a neural network or by an expert, as discussed above with respect to method 600 in FIG. 6. At step 1014, the method 1000 adds the generated experience tuples to an experience pool.

At step 1016, the method 1000 determines whether it needs to generate more experience tuples. The method 1000 may make the determination based on a criterion similarly to step 614 in FIG. 600. The method 1000 may go back to step 1002 when it needs to perform more exploration. In this case, the method 1000 may reselect a subset of groups of cells and/or the cells in each selected group for optimization. Alternatively, the method 1000 may skip steps 1002 and 1004, and use the same cells that have been selected for more exploration. When determining that no more exploration is needed, the method 1000 may proceed to step 1018, where a mini batch of experience tuples is generated using the experience pool. The method moo may select experience tuples from the experience pool based on a predefined criterion to produce the mini batch. For example, a threshold number or percentage of experience tuples may be selected from the pool. In another example, the method may select the experience tuples from the experience pool using a probabilistic approach or based on relationships between the experience tuples. In some embodiments, the mini batch may include one or more expert-generated experience tuples. In this case, the method 1000 may select experience tuples for the mini batch using steps 616-620 in method 600 of FIG. 6.

When the mini batch is produced, the method 1000 may determine whether an action in each of the experience tuples of the mini batch is acceptable or rejectable based on the global reward and local reward of the respective experience tuple. Based on the determination, gradients, may be positive or negative, are calculated and applied for the actions and weights of the neural network are updated accordingly.

Steps 1020-1028 will be performed for each action in experience tuples of the mini batch. At step 1020, the method 1000 determines whether an action is acceptable at a global level based on the global reward associated with the action. When the action is not acceptable at the global level, the method 1000 proceeds to step 1026, where the action is rejected for this cell's experience. When the action is acceptable at the global level, the method 1000 proceed to step 1022, where the method 1000 continues to determine whether the action is acceptable at a cell level based on the local reward associated with the action. When the action is not acceptable at the cell level, the method 1000 proceeds to step 1026, where the action is rejected for this cell's experience. When the action is acceptable at the cell level, the method 1000 proceeds to step 1024, where the action is accepted for this cell's experience. At step 1028, based on the determination whether the action is accepted or rejected, the method 1000 calculates and applies a gradient for the action and updates the neural network's weights. For example, for a cell experience with an action rejected, the method 1000 may apply a negative gradient for this action to discourage it; and for a cell experience with an action accepted, the method 1000 may apply a positive gradient for this action to encourage it. Those of ordinary skill in the art would recognize that the gradients may be calculated and neural networks' weights may be updated using various methods.

The method 1000 may determine whether an action is acceptable at a global level based on the global reward associated with the action according to various criteria and using various mechanisms. For example, when the global reward associated with the action exceeds a threshold, the action is determined to be acceptable at the global level; otherwise, when the global reward associated with the action does not exceed the threshold, the action is rejected. The threshold may be a reward value predefined or selected from historical data of the cell. For example, the threshold may be the best global reward value that has been obtained for the cell corresponding to a plurality of actions performed on the cell in the past, or in a period of time. Thus, based on this threshold, an action for a cell associated with a global reward that is better than the best ever global reward value that has been achieved for the cell is accepted, and a positive gradient is back-propagated for updating the neural network; and any action for the cell having a global reward that is worse than the best ever global reward value is rejected, and a negative gradient is back-propagated. This mechanism may be understood as multiple DRL agents competing for selecting actions for the cells of interest, in a purpose of gaining a better global reward based on the same initial configurations (or states) of the cells. The initial configurations of the cells may include some initial parameters of the cells before a cell optimization process or a deep learning process begins for these cells. Each DRL agent selects an action for applying to the cell, and a DRL agent wins if it selects an action that results in a global reward that is better than the historical best reward. Alternatively, a DRL agent with an action resulting in a best global reward among the DRL agents wins. Competition among the DRL agents helps improve the intelligence of the DRL agents iteratively.

In some embodiments, a simulated-annealing based mechanism may be used. In this example, when a global reward associated with an action performed on a cell exceeds a global reference reward by or more than a first global threshold (GT1), i.e., (global reward−global reference reward)>=GT1, the action is accepted at the global level; and when the global reward associated with the action does not exceed the global reference reward by a second global threshold (GT2), i.e., (global reward−global reference reward)<GT2, the action is rejected. In other words, a global upper bound, i.e., (global reference reward+GT1), and a global lower bound, i.e., (global reference reward+GT2) are defined. An action with a global reward equal to or greater than the global upper bound is accepted, and an action with a global reward less than the global lower bound is rejected. In other words, two thresholds may be defined, e.g., threshold 1 and threshold 2. The action is accepted at the global level if the global reward is equal to or greater than the threshold 1, and the action is not accepted at the global level if the global reward is less than the threshold 2. An action with a global reward between the threshold 1 and threshold 2 may be accepted or not, and this may be determined based on another criterion.

The global reference reward may be a predefined reward value, or a reward value selected based on a predefined rule. For example, the global reference reward may be the best global reward value that has been obtained for the cell corresponding to a plurality of actions performed on the cell in the past. When the global reward associated with the action does not fall within these two categories, a metropolis criterion may be used to determine whether the action is accepted or rejected at the global level. For example, a random uniform probability value between 0 and 1 may be generated, and the action is determined to be accepted or not by comparing the value with a threshold. For example, when the value is greater than the threshold, the action is accepted; and when the value is not greater than the threshold, the action is rejected.

The method 1000 may also determine whether an action of a cell is acceptable at a cell level based on the local reward associated with the action according to various criteria and using various mechanisms. For example, when the local reward associated with an action performed on a cell exceeds a threshold, the action is determined to be acceptable at the cell level; otherwise, when the local reward associated with the action does not exceed the threshold, the action is rejected at the cell level. The threshold may be a reward value predefined or selected from historical data with respect to the cell. For example, the threshold may be an initial local reward value of the cell corresponding to an initial state of the cell. The initial local reward value of the cell may be calculated based on an initial state of the cell with or without a first action being taken for the cell. In this case, actions causing degradation of the local rewards compared with the initial reward will be rejected and applied with negative gradients, and actions that can achieve better cell level rewards compared with the initial reward will be accepted and applied with positive gradients. This example may be understood as multiple DRL agents are cooperating to select actions for the cell so as to mitigate risks of performance degradation at the cell level.

In some embodiments, a simulated-annealing based mechanism may be used to determine whether an action is accepted or not at the cell level. For example, when a local reward associated with an action performed on a cell exceeds a local reference reward by or more than a first local threshold (LT1), i.e., (local reward−local reference reward) >=LT1, the action is accepted at the cell level; and when the local reward associated with the action does not exceed the local reference reward by a second local threshold (LT2), i.e., (local reward−local reference reward)<LT2, the action is rejected. In other words, a local upper bound, i.e., (local reference reward+LT1), and a local lower bound, i.e., (local reference reward+LT2) are defined. An action with a local reward greater than the local upper bound is accepted, and an action with a local reward less than the local lower bound is rejected. The local reference reward may be a predefined reward value, or a reward value selected based on a predefined rule. For example, the local reference reward may be an initial local reward value of the cell corresponding to an initial action performed on the cell. When the local reward associated with the action does not fall within these two categories, a metropolis criterion may be used to determine whether the action is accepted or rejected at the cell level. For example, a random uniform probability value between 0 and 1 may be generated, and the action is determined to be accepted or not by comparing the value with a threshold. For example, when the value is greater than the threshold, the action is accepted; and when the value is not greater than the threshold, the action is rejected.

At step 1030, the method 1000 determines whether the neural network needs more or further training. The determination may be made similarly to step 628 in method 600 of FIG. 6. When the method 1000 determines that more training is needed, it goes back to step 1002 to continue the training as discussed above. When no more training is needed, the method 1000 stops the training, and outputs the training result.

The neural network trained according to method 1000 may then be used to adjust a cell parameter of a cell in the wireless network based on the current state of the cell. In some embodiments, method 1000 may select an action for adjusting a cell parameter of a cell based on the trained neural network and a state of the cell, and instruct to adjust the cell parameter of the cell according to the selected action.

The embodiment method may be implemented using various DRL techniques with various neural networks such as Deep Q-Network, Double Q, Dueling Network, A3C, Deep Sarsa, convolutional neural network, recurrent neural networks, Deep Boltzmann machines, deep belief networks, etc.

The trained neural network can help reduce the number of iteration needed to adjust cell parameters of the wireless network according to an optimization objective, and thus reduce the cost associated with site visiting. The embodiment method may also help achieve one-shot optimization of the wireless network. In some embodiments, by using the embodiment method, cell or network parameters, such as eTilt, mTilt, azimuth, or transmission power, may only need to be adjusted once, rather than iteratively, to achieve an optimization objective. This can greatly reduce the time and cost taken for site visiting. The embodiment does not need information of UE locations, and thus avoid time-consuming and costly drive tests for obtaining the location information. The embodiment also has an advantage of tolerating inaccurate engineer parameters, which avoids time-consuming and costly onsite verification of the engineer parameters. The embodiment method greatly improves the intelligence and performance of a DRL agent and may be used in solving many wireless network optimization problems.

Figure 11:
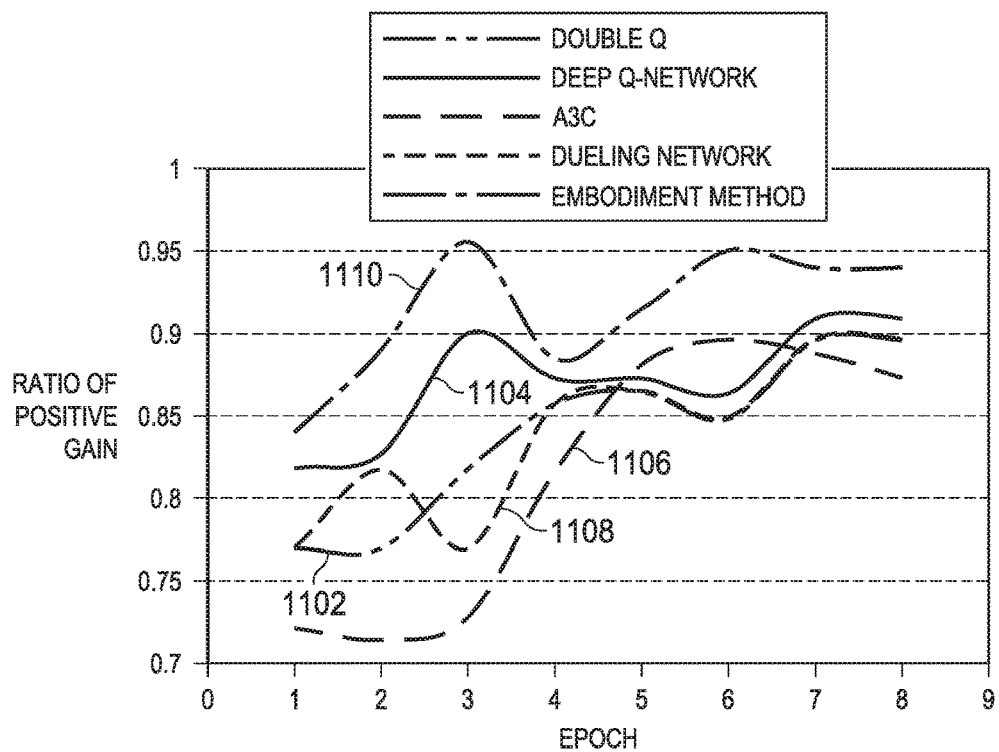
FIG. 11 illustrates a graph showing a ratio of positive gain obtained using DRL.

FIG. 11 illustrates a graph showing a ratio of positive gain obtained using the embodiment method 1000 and other state-of-art DRL algorithms. Curve 1102, 1104, 1106, 1108, and 1110 indicates, respectively, the ratio of positive gain obtained by using methods of double Q, deep Q-network, A3C, Dueling network and the embodiment method moo. As shown, the embodiment method has a higher gain than all the other algorithms.

Figure 12:
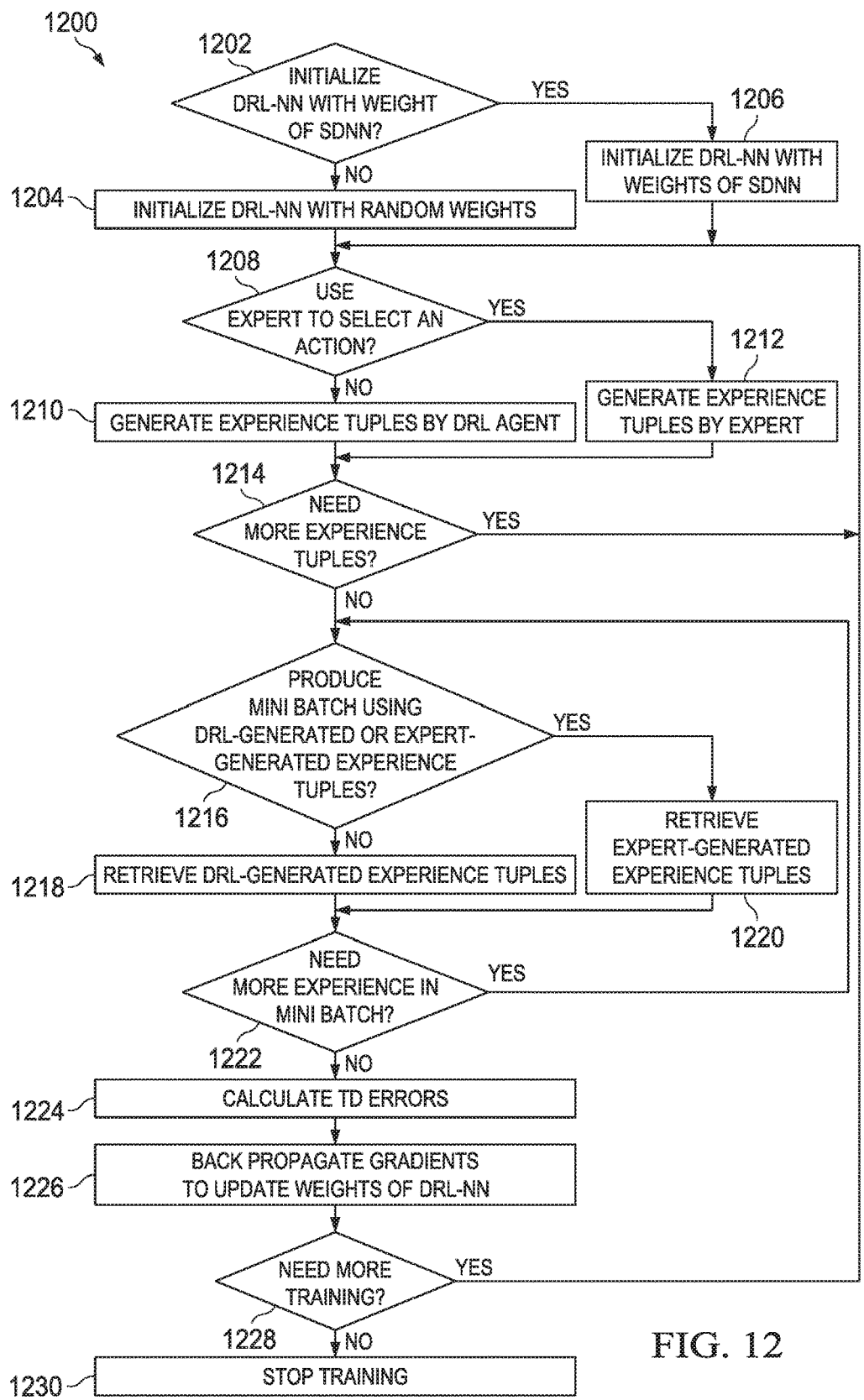
FIG. 12 illustrates a flowchart of an embodiment method for adjusting cell parameters using a DRL technique.

FIG. 12 illustrates a flowchart of an embodiment method 1200 for adjusting cell parameters of a plurality of cells in a wireless network using a DRL technique. Specifically, the method 1200 utilizes the DRL method 600 to train a DRL neural network (DRL-NN) for selecting actions to adjust cell parameters of two cells (cell 1 and cell 2) associated with two base stations. The two cells are selected from 32 cells in the wireless network. At step 1202, the method 1200 determines whether the DRL-NN is initialized with randomly selected weight values, or with weight values of an expert supervised deep neural network (SDNN). The expert SDNN is a deep neural network that has been trained with expert supervising for wireless network optimization, or for adjusting similar cell parameters. The DRL method 1200 may determine to proceed to step 1204 to use random weight values to initialize the DRL-NN, or proceed to step 1206, where weight values of the expert SDNN are used to initialize the DRL-NN.

The method 1200 may then generate a plurality experience tuples for training the DRL-NN. Each experience tuple is represented by ($C_k$, $S_t$, $R_t$, $A_t$, $S_{t+1}$, $R_{t+1}$, Label). $C_k$ (k=1, 2) identifies the cell for which the experience tuple is generated, and the "Label" indicates whether the experience is a DRL-generated or expert-generated tuple. $S_t$, $R_t$, $S_{t+1}$, $A_t$, $R_{t+1}$ represents, respectively, a first state, a first reward associated with a previous action, a second state, an action that moves the cell from the first state to the second state, and a second reward associated with the action.

The two cells each have an initial state when the training begins. The state of a cell may be represented by a state tensor as discussed with respect to FIG. 10. For example, the state of cell 1 or cell may be indicated by a 32×32×10 image-like 3D tensor, including information of the cell of interest (i.e., cell 1 or cell 2) and relationship information with 31 neighbor cells of the cell of interest. The 3D tensor includes 10 feature planes including information such as tilt, azimuth, cumulative distribution function (CDF) of RSRP or RSRQ, an interference matrix, ISD, etc. For the convenience of illustration, in this example, each cell state is represented by a state vector (tilt, azimuth, CDF of RSRP). The RSRP is obtained from MRs collected from the 32 cells within a time window, such as within an hour, 12 hours, or a day.

In this example, an action may be selected to adjust a tilt, an azimuth, a transmission power, or any combination thereof. The action may be represented by an action vector (tilt, azimuth, power). Each vector element represents a value for adjusting a cell parameter. An action may indicate a relative change or an absolute value for adjustment. In this example, an element value in the action vector indicates a target value that the corresponding parameter will be adjusted to. For example, a selected action (5, 15, N/A) indicates adjusting the tilt to 5°, azimuth to 15°, and not adjusting the transmission power. For each of cell 1 and cell 2, at step 1208, the method 1200 determines whether expert is used to select an action to adjust cell parameters of corresponding cells. Based on the determination at step 1208, the method 1200 may go to step 1210 generating DRL-generated experience tuples, or go to step 1212 generating expert-generated experience tuples. The method 1200 may select an action (tilt, azimuth, power), apply the selected action to the corresponding cell, update the cell's state, and calculate the reward, thereby generating an experience tuple. For example, the method 1200 may select an action (−5, +15, N/A) for cell 1 using the DRL-NN, and select an action (+5.2, N/A, N/A) for cell 2 according to an expert. The method 1200 adjusts parameters of cell 1 and cell 2 according to the selected actions, respectively, updates their states, i.e., generates updated state vectors, and calculates their corresponding rewards. In one example, the reward may be calculated using the cost function as discussed with respect to FIG. 10. In this example, the reward for each cell is calculated by $f_{cost}=(0.5*N1+0.5*N2)/N$, where N1 is the number of MRs received from UEs in the 32 cells whose RSRP of a serving cell is greater than or equal to a RSRP threshold, N2 is the number of MRs received from the UEs in the 32 cells whose RSRQ of a serving cell is greater than or equal to a RSRQ threshold, and N is the total number of MRs received from the UEs in the 32 cells. The reward indicates whether an action for a cell is on the right track to adjust the setting of a base station providing a coverage area of the cell for improving the performance of the wireless network.

At step 1214, the method 1200 determines whether it needs to generate more experience tuples. The method 1200 may select a sequence of actions for cell 1 and cell 2, and generate a plurality of experience tuples for each of the two cells. The method 1200 may go back to step 1208 to generate more experience tuples. When an experience is generated, it will be saved in the experience pool for future retrieving. When no more experience tuples are needed, the method 1200 may retrieve a mini batch of experience tuples from the experience pool. At step 1216, the method 1200 determines whether DRL-generated or expert-generated experience tuples are selected for the mini batch. When determining to use a DRL-generated experience tuple, at step 1218, the method 1200 retrieves a DRL-generated experience tuple ($C_k$, $S_t$, $R_t$, $A_t$, $S_{t+1}$, $R_{t+1}$, DRL) from the experience pool. When determining to use an expert-generated experience tuple, at step 1220, the method 1200 retrieves an expert-generated experience tuple ($C_k$, $S_t$, $R_t$, $A_t$, $S_{t+1}$, $R_{t+1}$, Expert) from experience pool. When the method 1200 determines, at step 1222, that the mini batch needs more experience tuples, it goes back to step 1216 to continue select more experience tuples for the mini batch from experience pool; Otherwise, it goes to step 1224. At step 1224, the method 1200 calculates a TD error corresponding to each action of the experience tuples in the mini batch using a loss function. For example, the TD error may be calculated for minimizing MSE loss by stochastic gradient descent. At step 1226, the method 1200 back-propagates gradients calculated according to the TD errors to update weights of the DRL-NN. At step 1228, the method 1200 determines whether the DRL-NN needs more training. The method 1200 may go to step 1230 and stop the training, or go to step 1208 to perform further training.

Figure 13:
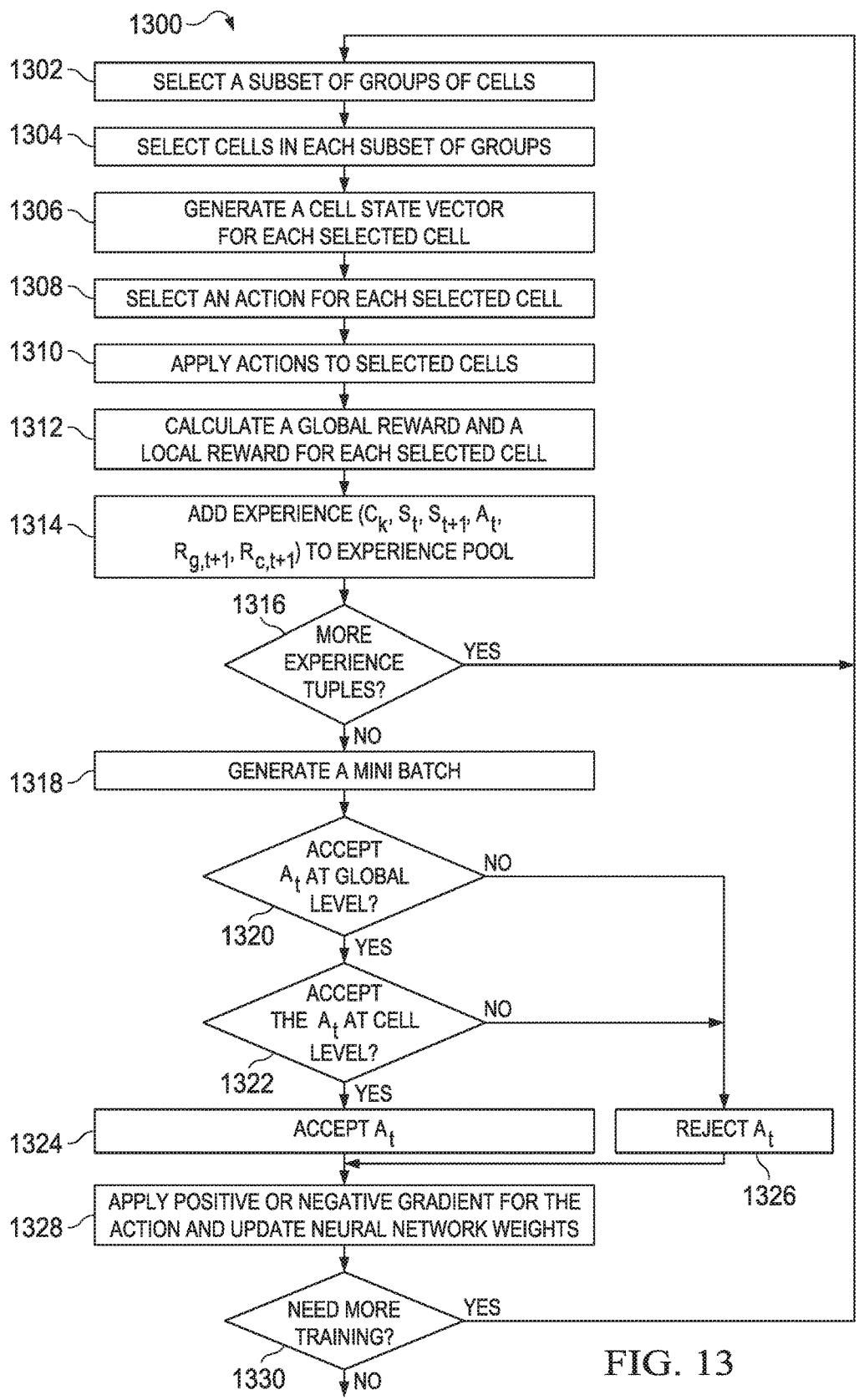
FIG. 13 illustrates a flowchart of another embodiment method for adjusting cell parameters using a DRL technique.

FIG. 13 illustrates a flowchart of another embodiment method 1300 for adjusting cell parameters of a plurality of cells in a wireless network using a DRL technique. The method 1300 trains a DRL-NN for adjusting one or more parameters of a plurality of cells, and uses the trained DRL-NN for wireless network optimization. In this embodiment, 50 cells in the wireless network are divided into 5 groups, with each group having 10 cells. Training of the DRL-NN starts from step 1302, where the method 1300 selects 5 groups of cells to be optimized. At step 1304, the method 1300 selects two cells in each of the 5 groups for network optimization. As discussed with respect to FIG. 10, the groups and cells may be selected according to various criteria.

The two cells in each group have an initial state when the training begins. The state of a cell may be represented by a state tensor as discussed with respect to FIG. 10. For the convenience of illustration, in this example, each cell state is represented by a state vector (tilt, azimuth, CDF of RSRP), as described above with respect to FIG. 12. The RSRP is obtained from MRs collected from a predetermined number of cells within a time window, such as within an hour, 12 hours, or a day. At step 1306, the method 1300 generates a cell state vector for each of the two cells in each of the five groups.

At step 1308, the method 1300 selects an action for each of the selected cells. In this example, an action vector (tilt, azimuth, power) is used to represent an action that may adjust a tilt, an azimuth, a transmission power, or any combination thereof. In this example, an element value in the action vector indicates a relative value that the corresponding parameter will be adjusted. For example, a selected action (+2, −10, N/A) indicates adjusting the tilt upward by 2°, adjusting the azimuth left-ward by 10°, and not adjusting the transmission power. For example, the method 1300 may select an action (+5, −20, N/A) for a selected first cell in a selected group, and select an action (−3, N/A, N/A) for a selected second cell in the selected group.

At step 1310, the method 1300 applies the selected actions to the selected cells in the five groups, i.e., adjusts the corresponding cell parameters according to the action vectors. The method 1300 may then updates states of the selected cells. The state of each cell will indicate that the corresponding cell parameters have been adjusted according to the selected action. At step 1312, the method 1300 calculates a global reward and a local reward for each of the selected cells with an action selected and performed. In one example, both the global reward and the local reward of a cell may be calculated using the same cost function. In this example, a cost function $f_{cost}=(0.5*N1+0.5*N2)/N$ is used, where N1 is the number of MRs received from UEs whose serving RSRP is greater than or equal to a RSRP threshold, N2 is the number of MRs received from UEs whose serving RSRQ is greater than or equal to a RSRQ threshold, and N is the total number of MRs received from the UEs. A local reward for an action applied to a cell is calculated using MRs received from UEs in the cell, and a global reward for the action applied to the cell is calculated using MRs received from UEs in all the cells in the wireless network. The local reward indicates whether the action selected is on the right track to adjust the setting of a base station providing a coverage of the cell for improving the performance of the cell itself in terms of the cost function, and the global reward indicates whether the action selected is on the right track to adjust the setting of the base station for improving the performance of all the cells in the wireless network in terms of the cost function. The method 1300 thus generates an experience tuple for each of the selected cells ($C_k$, $S_t$, $S_{t+1}$, $A_t$, $R_{g,t+1}$, $R_{c,t+1}$). At step 1314, adds the generated experience tuples to an experience pool.

At step 1316, the method 1300 determines whether it needs to generate more experience tuples. The method 1300 may go back to step 1302 when it needs to perform more exploration. In this case, the method 1300 may select a different number of groups and a different number of cells. When determining that no more exploration is needed, the method 1300 may proceed to step 1318, where a mini batch of experience tuples is generated using the experience pool. In one example, the mini batch may include 128 experience tuples. For each of the experience tuples, the method determines whether an action in the corresponding experience tuple is acceptable and updates the DRL-NN based on the determination result.

At step 1320, the method 1300 determines whether an action in an experience tuple for a cell is acceptable at a global level based on the corresponding global reward. In this example, the method 1300 determines whether the global reward is greater than a best global reward value by 5%. The best global reward value is a global reward that has been obtained for the cell corresponding to a plurality of actions performed on the cell during training of the DRL-NN. When the action is not acceptable at the global level, the method 1300 proceeds to step 1326, where the action is rejected. When the action is acceptable at the global level, the method 1300 proceed to step 1322, where the method 1300 continues to determine whether the action is acceptable at a cell level based on the local reward associated with the action. In this example, the method 1300 determines whether the local reward is greater than an initial reward value of the cell by 3%. The initial local reward value of the cell is calculated based on MRs received from UEs in the cell when the cell is in an initial state without taking any action. When the action is not acceptable at the cell level, the method 1300 proceeds to step 1326, where the action is rejected. When the action is also acceptable at the cell level, the method 1300 proceeds to step 1324, where the action is accepted. At step 1328, based on the determination whether the action is accepted or rejected, the method 1300 calculates and applies a gradient for the action and updates the neural network's weights. For example, a gradient may be back-propagated by a chain rule. At step 1330, the method 1300 determines whether the neural network needs more or further training. When the method 1300 determines that more training is needed, it goes back to step 1302 to continue the training as discussed above. When no more training is needed, the method 1300 stops the training, and outputs the training result.

The trained DRL-NN may then be used to adjust a cell parameter of a cell in the wireless network. The method 1300 may select an action for adjusting a cell parameter of a cell based on the trained neural network, and instruct to adjust the cell parameter of the cell according to the selected action. A neural network may include a plurality of output nodes, and each node may stand for an action to be taken. An action may be selected based on values output for the output nodes. For example, in a case where an action is defined as adjusting a tilt value, a neural network may have 5 output nodes standing for tilt relative changes of −2°, −1°, 0°, 1°, 2°, respectively. In another example, in a case where an action is defined as adjusting a tilt and/or an azimuth, a neural network may have 5×3 matrix of nodes standing for joint adjustment of tilt and azimuth, with 5 rows of this 5×3 matrix indicating adjusting tilt by −2°, −1°, 0°, 1°, and 2°, and 3 columns indicating adjusting azimuth by −10°, 0°, 10°. In either case, an action may be selected by selecting a node based on a value output for that node. For example, when the values output for the nodes are taken as probability, a node with the highest probability may be selected.

Figure 14:
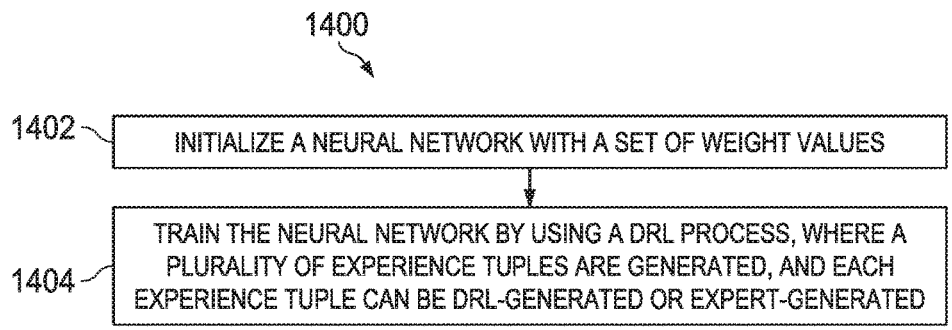
FIG. 14 illustrates a flowchart of yet another embodiment DRL method.

FIG. 14 illustrates a flowchart of another embodiment DRL method 1400. At step 1402, the method 1400 initializes a neural network with a set of weight values. The neural network is used to determine actions that adjust one or more settings of cells associated with base stations in a wireless network, and each base station provides communication services to UEs within one or more cells.

At step 1404, the method 1400 trains the neural network by using a DRL process, where a plurality of experience tuples are generated and each experience tuple can be DRL-generated or expert-generated. The DRL process includes generating a first plurality of experience tuples for a plurality of cells in the wireless network. Each experience tuple includes a cell identifier that identifies a cell, a first state of the cell, a second state of the cell, an action that causes the cell to transit from the first state to the second state, and a reward value for taking the action. A state of a cell includes a setting of a base station providing a coverage area of the cell, and a reward value is calculated using a cost function based on measurement reports received from UEs in the wireless network. Each experience tuple can be a DRL-generated experience tuple in which a respective action is selected by a DRL agent based on the neural network according to a DRL technique or an expert-generated experience tuple in which the respective action is provided based on expert experience. Whether an action is selected by the DRL agent based on the neural network or provided based on the expert experience is determined based on a first criterion.

The DRL process also includes selecting a second plurality of experience tuples from the first plurality of experience tuples. The second plurality of experience tuples may be used for updating the set of weight values of the neural network. The DRL process further includes updating the set of weight values of the neural network according to the reward values of the second plurality of experience tuples.

The first criterion may be a probability based criterion, a similarity based criterion or a threshold based criterion. In some embodiments, initializing the neural network with the set of weight values may include determining whether the neural network is initialized with randomly selected weight values or weight values obtained from an expert neural network. The expert neural network has been trained using a deep learning technique and is able to provide weight values for initializing the neural network. In some embodiments, generating the first plurality of experience tuples may include determining, based on the first criterion, whether an experience tuple is generated using an action that is selected by the DRL agent based on the neural network or whether the experience tuple is provided based on the expert experience. In some embodiments, selecting the second plurality of experience tuples from the first plurality of experience tuples may include determining whether selecting a DRL-generated experience tuple or an expert-generated experience tuple from the first plurality of experience tuples based on a second criterion. The second criterion may be a threshold based criterion, a probability based criterion, a similarity based criterion, a criterion based on relationship among experience tuples, or a criterion based on importance sampling.

Figure 15:
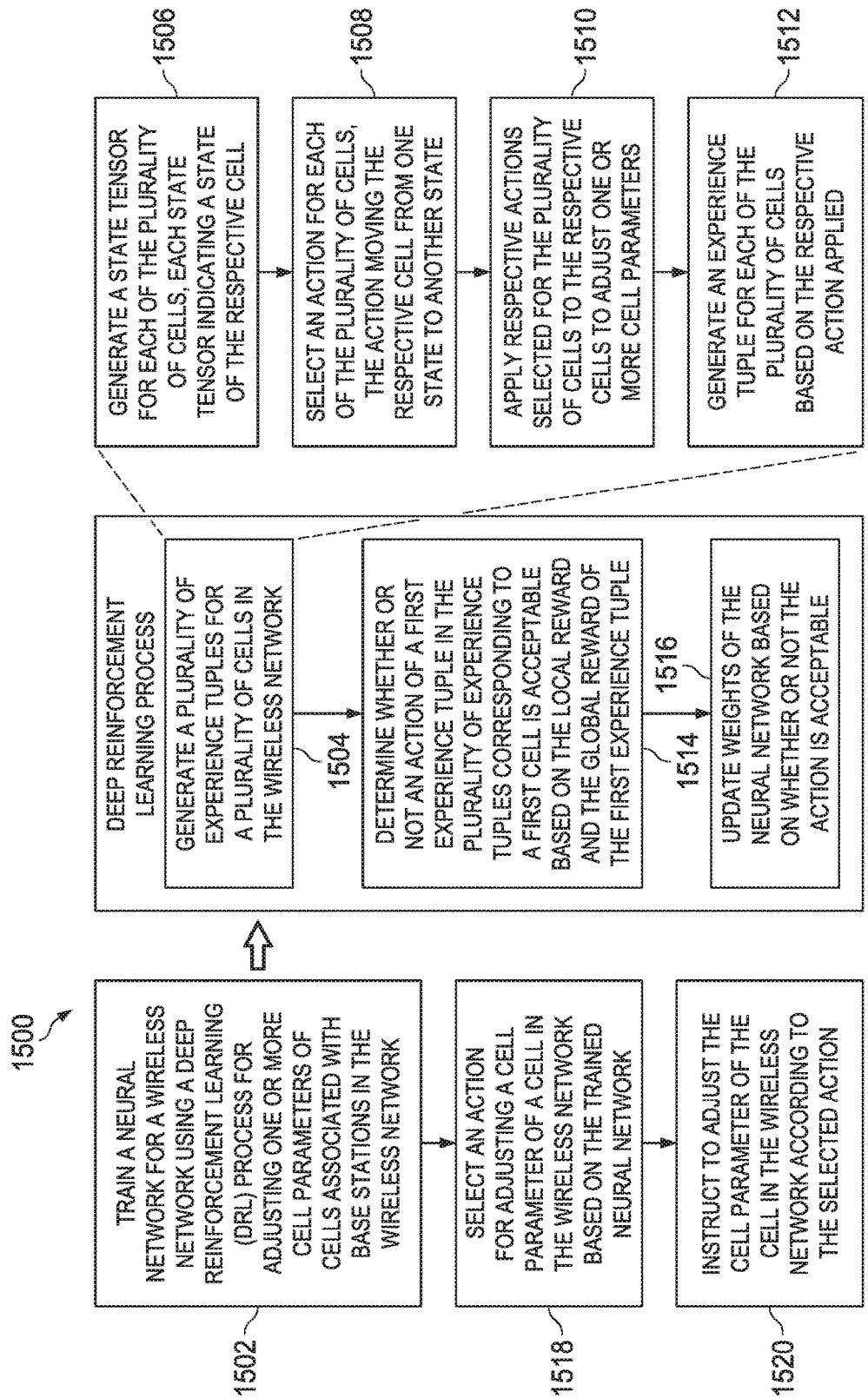
FIG. 15 illustrates a flowchart of yet another embodiment method for adjusting cell parameters.

FIG. 15 illustrates a flowchart of an embodiment method 1500. The method 1500 may be used to adjust one or more cell parameters of a wireless network for generally optimizing the wireless network according to an objective. At step 1502, the method 1500 performs training of a neural network for a wireless network using a deep reinforcement learning (DRL) process for adjusting one or more cell parameters of cells associated with base stations in the wireless network. Each base station provides communication services to user equipments (UEs) within a coverage area of one or more associated cell, and the neural network is trained to determine actions that can be performed on the base stations of the wireless network.

In some embodiments, the DRL process includes performing steps 1504, 1514 and 1516. As shown, at step 1504, the DRL process generates a plurality of experience tuples for the plurality of cells. In some embodiments, generating the plurality of experience tuples may include steps 1506-1512. At step 1506, the DRL process generates a state tensor for each of the plurality of cells. Each state tensor indicates a state of the respective cell. A state tensor of a cell may include at least a cell parameter of the cell and information obtained from a measurement report provided by a UE. A state of a cell comprises a setting of a base station associated with the cell, the base station providing a coverage area of the cell. A state tensor may also include information of inter-site distance (ISD), a height of a base station, an antenna azimuth, an antenna mechanical tilt (mTilt), an antenna electronic tilt (eTilt), a key performance indicator, reference signal received power (RSRP), reference signal received quality (RSRP), signal interference to noise ratio (SINR), channel quality indicator (CQI)), an objective function, a cumulative distribution function of network performance measurements, or an interference factor matrix. At step 1508, the DRL process selects an action for each of the plurality of cells. An action moves the respective cell from one state to another state. An action includes information for adjusting a setting of a base station associated with the cell. At step 1510, the DRL process applies the respective actions selected for the plurality of cells to the respective cells to adjust one or more cell parameters. At step 1512, the DRL process generates an experience tuple for each of the plurality of cells based on the respective action applied. An experience tuple includes a cell identifier identifying the respective cell, a first state of the respective cell that is indicated by a respective state tensor, a second state of the respective cell, the action applied to the respective cell that moves the respective cell from the first state to the second state, a local reward calculated for applying the action to the respective cell, and a global reward calculated for applying the action to the respective cell. In some embodiments, the local reward may be calculated based on a local cost function and the global reward may be calculated based on a global cost function. The local reward and the global reward may be calculated using information from different cells in the communications network.

At step 1514 of the DRL process, the DRL process determine whether or not an action of a first experience tuple in the plurality of experience tuples corresponding to a first cell is acceptable based on the local reward and the global reward of the first experience tuple. At step 1516 of the DRL process, the DRL process updates weights of the neural network based on whether or not the action is acceptable. The DRL process may further select the plurality of cells from the wireless network based on a predefined criterion.

When the neural network has been trained, at step 1518, the method 1500 selects an action for adjusting a cell parameter of a cell in the wireless network based on the trained neural network. The cell parameter of the cell may include an engineer parameter of a base station associated with the cell. At step 1520, the method 1500 instructs to adjust the cell parameter of the cell according to the selected action.

In some embodiments, selecting the action for each of the plurality of cells may include selecting an action for a cell in the plurality of cells using the neural network based on the state tensor of the cell. In some other embodiments, selecting the action for each of the plurality of cells comprises selecting an action for a cell in the plurality of cells according to expert experience.

In some embodiments, determining whether or not the action of the first experience tuple in the plurality of experience tuples is acceptable may include determining whether the global reward of the first experience tuple satisfies a first criterion; when the global reward of the first experience tuple satisfies the first criterion, determining whether the local reward of the first experience tuple satisfies a second criterion; and when the global reward of the first experience tuple satisfies the first criterion and the local reward of the first experience tuple satisfies the second criterion, determining that the action is acceptable. The method 1500 may also include determining that the action is not acceptable when the global reward of the first experience tuple does not satisfy the first criterion or the local reward of the first experience tuple does not satisfy the second criterion.

In some embodiments, the method 1500 may determine that the global reward of the first experience tuple satisfies the first criterion when the global reward exceeds a first threshold. The method 1500 may also determine that the global reward of the first experience tuple does not satisfy the first criterion when the global reward is less than a second threshold. The first threshold or the second threshold may be a best global reward value that has been obtained for the first cell.

In some embodiments, the method 1500 may determine that the local reward of the first experience tuple satisfies the second criterion when the local reward exceeds a third threshold. The method may further determine that the local reward of the first experience tuple does not satisfy the second criterion when the local reward does not exceed a fourth threshold. The third threshold or the fourth threshold may be an initial local reward value obtained for the first cell. In some embodiments, updating the weights of the neural network based on whether or not the action is acceptable may include applying a positive gradient when the action is acceptable; and applying a negative gradient when the action is not acceptable.

Figure 16:
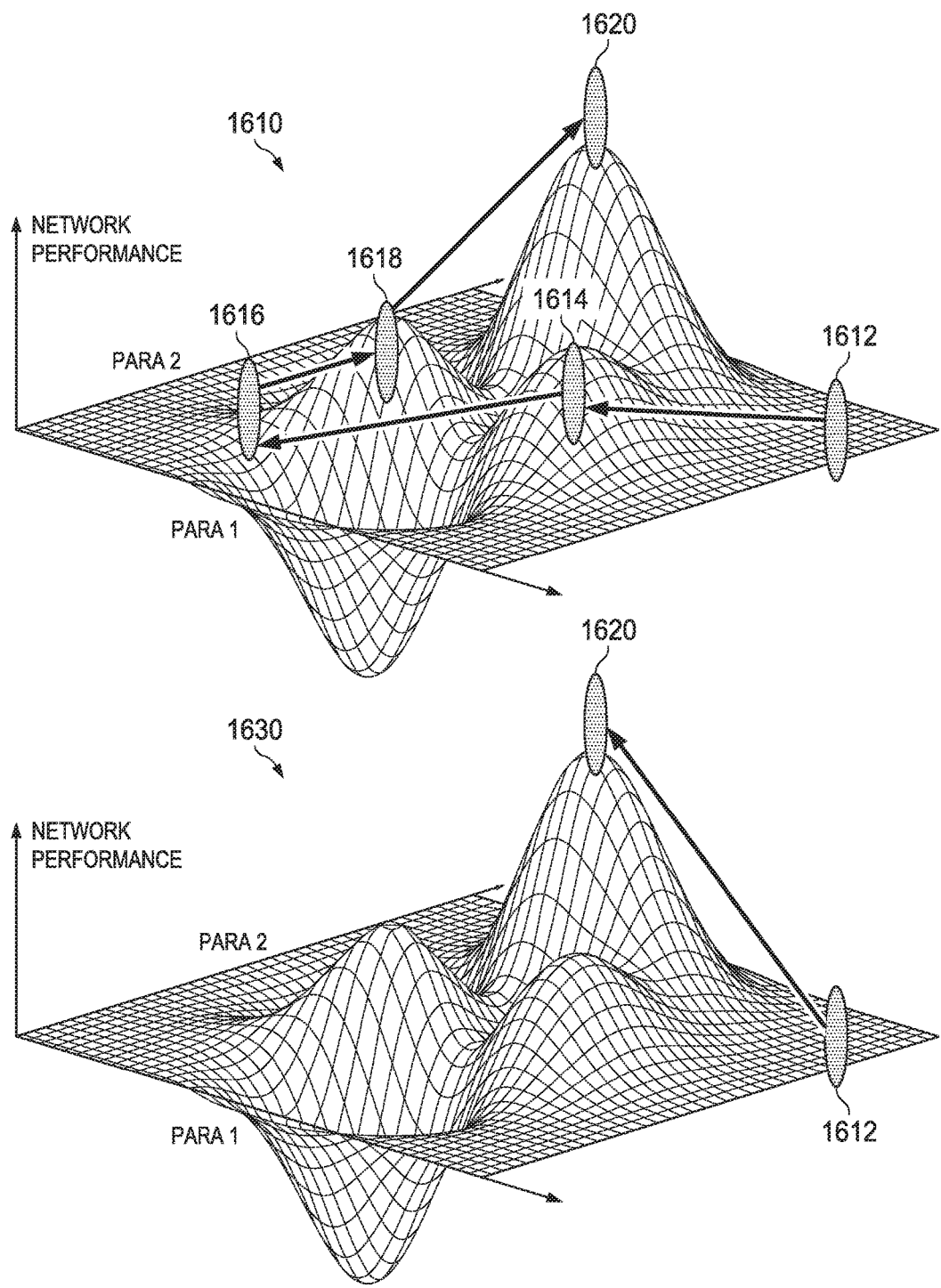
FIG. 16 illustrates graphs showing one-shot optimization and iterative optimization.

Embodiments of the present disclosure have many advantages in performing wireless network optimization, such as shorter training time of a neural network, improved intelligence of DRL agents, and less cost for adjusting cells. Further, the embodiments do not require UE location information and accurate engineer parameters. Moreover, the embodiments help achieve the so-called one-shot optimization, where cell parameters may be adjusted once, instead of iteratively. This greatly reduces the time and cost for wireless network optimization. FIG. 16 illustrates graphs showing one-shot optimization and iterative optimization. FIG. 16 includes 3-dimensional graphs 1610 and 1630, both of which show network performance varying with a pair of parameters, i.e., Para 1 and Para 2, of a wireless network. The x axis represents Para 1, y axis represents Para 2, and z axis represents the network performance. Point 1620 corresponds to an optimal point where a specific pair of the parameters results in generally optimal network performance. Taking, as an example, Para 1 and Para 2 as cell parameters of two cells in the wireless network, Para 1 and Para 2 may be understood to indicate states of the two cells, respectively. Thus, according to the graphs, varying the states of the two cells causes the network to have different levels of performance.

As shown, in this example, point 1612 is a starting point indicating initial states of the two cells, and actions are to be selected for the two cells so that the network performance can be improved from the starting point 1612 to reach the optimal point. Graph 1610 shows that iterative optimization has been performed for the two cells to move from the starting point 1612 to point 1614, to point 1616, to point 1618, and then to reach the optimal point 1620. While for one-shot optimization, as shown in graph 1630, the two cells are moved from the point 1612 directly to the optimal point 1620, without going through an intermediate point. One-shot optimization will be greatly appreciated when implementable for wireless network optimization.

Figure 17:
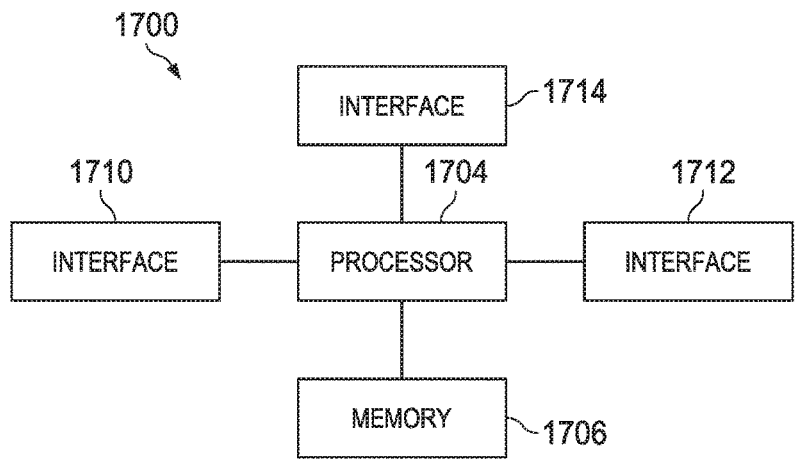
FIG. 17 illustrates a diagram of an embodiment processing system.

FIG. 17 illustrates a block diagram of an embodiment processing system 1700 for performing methods described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1704. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 6, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 18:
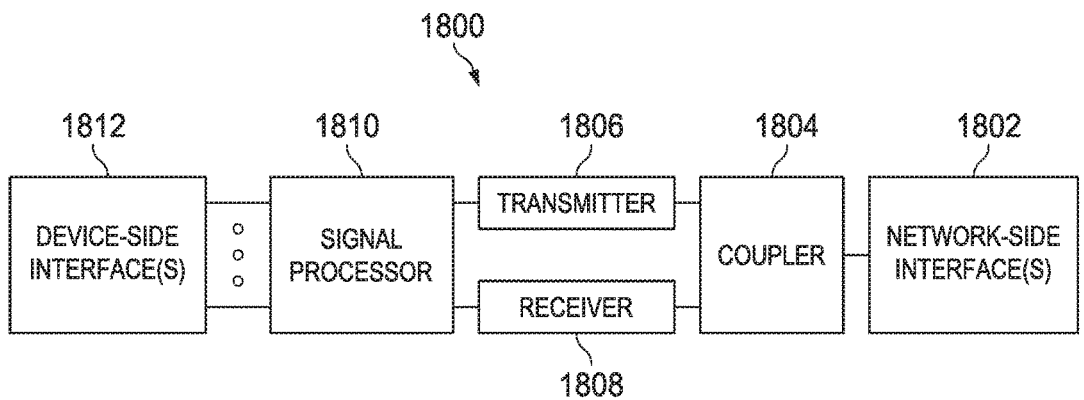
FIG. 18 illustrates a diagram of an embodiment transceiver.

In some embodiments, one or more of the interfaces 1710, 1712, 1714 connects the processing system 1700 to a transceiver adapted to transmit and receive signaling over the telecommunications network. FIG. 18 illustrates a block diagram of a transceiver 1800 adapted to transmit and receive signaling over a telecommunications network. The transceiver 1800 may be installed in a host device. As shown, the transceiver 1800 comprises a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 comprises one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Additional aspects may be realized from the following examples.

Example 1

A method comprising: initializing a neural network with a set of weight values, the neural network being used to determine actions that adjust one or more settings of cells associated with base stations in a wireless network, each base station providing communication services to user equipments (UEs) within one or more cells; and training the neural network by using a deep reinforcement learning (DRL) process, the DRL processing comprising generating a first plurality of experience tuples for a plurality of cells in the wireless network, each experience tuple comprising a cell identifier that identifies a cell, a first state of the cell, a second state of the cell, an action that causes the cell to transit from the first state to the second state, and a reward value for taking the action, wherein a state of a cell comprises a setting of a base station providing a coverage area of the cell, and a reward value is calculated using a cost function based on measurement reports received from UEs in the wireless network, wherein each experience tuple can be a DRL-generated experience tuple in which a respective action is selected by a DRL agent based on the neural network according to a DRL technique or an expert-generated experience tuple in which the respective action is provided based on expert experience, and wherein whether an action is selected by the DRL agent based on the neural network or provided based on the expert experience is determined based on a first criterion; and selecting a second plurality of experience tuples from the first plurality of experience tuples; and updating the set of weight values of the neural network according to reward values in the second plurality of experience tuples.

Example 2

The method of example 1, the first criterion is a probability based criterion, a similarity based criterion or a threshold based criterion.

Example 3

The method of any one of examples 1-2, wherein initializing the neural network with the set of weight values comprises: determining whether the neural network is initialized with randomly selected weight values or weight values obtained from an expert neural network, the expert neural network having been trained using a deep learning technique and being able to provide weight values for initializing the neural network.

Example 4

The method of any one of examples 1-3, wherein generating the first plurality of experience tuples further comprises: determining, based on the first criterion, whether an experience tuple is generated using an action that is selected by the DRL agent based on the neural network or whether the experience tuple is provided based on the expert experience.

Example 5

The method of any one of examples 1-4, wherein selecting the second plurality of experience tuples from the first plurality of experience tuples comprises: determining whether selecting a DRL-generated experience tuple or an expert-generated experience tuple from the first plurality of experience tuples based on a second criterion.

Example 6

The method of any one of examples 1-5, wherein the second criterion is a threshold based criterion, a probability based criterion, a similarity based criterion, a criterion based on relationship among experience tuples, or a criterion based on importance sampling.

Example 7

A method comprising: training a neural network for a plurality of cells in a wireless network using a deep reinforcement learning (DRL) process for adjusting one or more cell parameters of cells associated with base stations in the wireless network, each base station providing communication services to user equipments (UEs) within a coverage area of one or more cells, and the neural network being trained to determine actions that can be performed on the base stations, wherein the DRL process comprises: generating a plurality of experience tuples for a plurality of cells in the wireless network, comprising: generating a state tensor for each of the plurality of cells, each state tensor indicating a state of a respective cell, wherein a state of a cell comprises a setting of a base station associated with the cell, the base station providing a coverage area of the cell; selecting an action for each of the plurality of cells, the action moving the respective cell from one state to another state, wherein an action comprises information for adjusting a setting of a base station associated with a cell; applying respective actions selected for the plurality of cells to the respective cells to adjust one or more cell parameters; and generating an experience tuple for each of the plurality of cells based on the respective action applied, the experience tuple comprising a cell identifier identifying the respective cell, a first state of the respective cell that is indicated by a respective state tensor, a second state of the respective cell, the action applied to the respective cell that moves the respective cell from the first state to the second state, a local reward calculated for applying the action to the respective cell, and a global reward calculated for applying the action to the respective cell, the local reward being calculated based on a local cost function and the global reward being calculated based on a global cost function; and determining whether or not an action of a first experience tuple in the plurality of experience tuples corresponding to a first cell is acceptable based on the local reward and the global reward of the first experience tuple; and updating weights of the neural network based on whether or not the action is acceptable; selecting an action for adjusting a cell parameter of a cell in the wireless network based on the trained neural network; and instructing to adjust the cell parameter of the cell in the wireless network according to the selected action.

Example 8

The method of example 7, wherein a state tensor of a cell comprises at least a cell parameter of the cell and information obtained from a measurement report provided by a UE.

Example 9

The method of any one of examples 7-8, wherein a state tensor comprises information of inter-site distance (ISD), a height of a base station, an antenna azimuth, an antenna mechanical tilt (mTilt), an antenna electronic tilt (eTilt), a key performance indicator, reference signal received power (RSRP), reference signal received quality (RSRP), signal interference to noise ratio (SINR), channel quality indicator (CQI)), an objective function, a cumulative distribution function of network performance measurements, or an interference factor matrix.

Example 10

The method of any one of examples 7-9, wherein the one or more cell parameters comprises an engineer parameter of a base station associated with a cell.

Example 11

The method of any one of examples 7-10, wherein the DRL process further comprises selecting the plurality of cells from the wireless network based on a predefined criterion.

Example 12

The method of any one of examples 7-11, wherein selecting the action for each of the plurality of cells comprises selecting an action for a cell in the plurality of cells using the neural network based on the state tensor of the cell.

Example 13

The method of any one of examples 7-12, wherein selecting the action for each of the plurality of cells comprises selecting an action for a cell in the plurality of cells according to expert experience.

Example 14

The method of any one of examples 7-13, wherein determining whether or not the action of the first experience tuple in the plurality of experience tuples is acceptable comprises: determining whether the global reward of the first experience tuple satisfies a first criterion; when the global reward of the first experience tuple satisfies the first criterion, determining whether the local reward of the first experience tuple satisfies a second criterion; and when the global reward of the first experience tuple satisfies the first criterion and the local reward of the first experience tuple satisfies the second criterion, determining that the action is acceptable.

Example 15

The method of any one of examples 7-14, further comprising determining that the action is not acceptable when the global reward of the first experience tuple does not satisfy the first criterion or the local reward of the first experience tuple does not satisfy the second criterion.

Example 16

The method of any one of examples 7-15, wherein determining whether the global reward of the first experience tuple satisfies the first criterion comprises: determining that the global reward of the first experience tuple satisfies the first criterion when the global reward exceeds a first threshold.

Example 17

The method of any one of examples 7-16, wherein the first threshold is a best global reward value that has been obtained for the first cell.

Example 18

The method of any one of examples 7-17, wherein determining whether the global reward of the first experience tuple satisfies the first criterion comprises: determining that the global reward of the first experience tuple does not satisfies the first criterion when the global reward is less than a second threshold.

Example 19

The method of any one of examples 7-18, wherein the second threshold is a best global reward value that has been obtained for the first cell.

Example 20

The method of any one of examples 7-19, wherein determining whether the local reward of the first experience tuple satisfies the second criterion comprises: determining that the local reward of the first experience tuple satisfies the second criterion when the local reward exceeds a third threshold.

Example 21

The method of any one of examples 7-20, wherein the third threshold is an initial local reward value obtained for the first cell.

Example 22

The method of any one of examples 7-21, wherein determining whether the local reward of the first experience tuple satisfies the second criterion comprises: determining that the local reward of the first experience tuple does not satisfy the second criterion when the local reward does not exceed a fourth threshold.

Example 23

The method of any one of examples 7-22, wherein updating the weights of the neural network based on whether or not the action is acceptable comprises: applying a positive gradient when the action is acceptable; and applying a negative gradient when the action is not acceptable.

Example 24

The method of any one of examples 7-23, wherein the local reward and the global reward are calculated using information from different cells in the wireless network.

Example 25

The method of any one of examples 7-24, wherein the one or more cell parameters comprise an antenna tilt, an antenna azimuth, or an antenna transmission power.

Example 26

An apparatus comprising: a non-transitory memory storage comprising instructions; and one or more processors in communication with the memory storage, wherein the one or more processors execute the instructions to: train a neural network for a plurality of cells in a wireless network using a deep reinforcement learning (DRL) process for adjusting one or more cell parameters of cells associated with base stations in the wireless network, each base station providing communication services to user equipments (UEs) within a coverage area of one or more cells, and the neural network being trained to determine actions that can be performed on the base stations, wherein the DRL process comprises: generating a plurality of experience tuples for a plurality of cells in the wireless network, comprising: generating a state tensor for each of the plurality of cells, each state tensor indicating a state of the respective cell, wherein a state of a cell comprises a setting of a base station associated with the cell, the base station providing a coverage area of the cell; selecting an action for each of the plurality of cells, the action moving the respective cell from one state to another state, wherein an action comprises information for adjusting a setting of a base station associated with the cell; applying respective actions selected for the plurality of cells to the respective cells to adjust one or more cell parameters; and generating an experience tuple for each of the plurality of cells based on the respective action applied, the experience tuple comprising a cell identifier identifying the respective cell, a first state of the respective cell that is indicated by a respective state tensor, a second state of the respective cell, the action applied to the respective cell that moves the respective cell from the first state to the second state, a local reward calculated for applying the action to the respective cell, and a global reward calculated for applying the action to the respective cell, the local reward being calculated based on a local cost function and the global reward being calculated based on a global cost function; and determining whether or not an action of a first experience tuple in the plurality of experience tuples corresponding to a first cell is acceptable based on the local reward and the global reward of the first experience tuple; and updating weights of the neural network based on whether or not the action is acceptable; and select an action for adjusting a cell parameter of a cell in the wireless network based on the trained neural network; and instruct to adjust the cell parameter of the cell in the wireless network according to the selected action.

Example 27

The apparatus of example 26, wherein a state tensor of a cell comprises at least a cell parameter of the cell and information obtained from a measurement report provided by a UE.

Example 28

The apparatus of any one of examples 26-27, wherein a state tensor comprises information of inter-site distance (ISD), a height of a base station, an antenna azimuth, an antenna mechanical tilt (mTilt), an antenna electronic tilt (eTilt), a key performance indicator, reference signal received power (RSRP), reference signal received quality (RSRP), signal interference to noise ratio (SINR), channel quality indicator (CQI)), an objective function, a cumulative distribution function of network performance measurements, or an interference factor matrix.

Example 29

The apparatus of any one of examples 26-28, wherein selecting the action for each of the plurality of cells comprises selecting an action for a cell in the plurality of cells using the neural network based on the state tensor of the cell.

Example 30

The apparatus of any one of examples 26-29, wherein selecting the action for each of the plurality of cells comprises selecting an action for a cell in the plurality of cells according to expert experience.

Example 31

The apparatus of any one of examples 26-30, wherein determining whether or not the action of the first experience tuple in the plurality of experience tuples is acceptable comprises: determining whether the global reward of the first experience tuple satisfies a first criterion; when the global reward of the first experience tuple satisfies the first criterion, determining whether the local reward of the first experience tuple satisfies a second criterion; and when the global reward of the first experience tuple satisfies the first criterion and the local reward of the first experience tuple satisfies the second criterion, determining that the action is acceptable.

Example 32

The apparatus of any one of examples 26-31, wherein updating the weights of the neural network based on whether or not the action is acceptable comprises: applying a positive gradient when the action is acceptable; and applying a negative gradient when the action is not acceptable.

Embodiments of the disclosure may be performed as computer-implemented methods. The methods may be implemented in a form of software. In one embodiment, the software may be obtained and loaded into a computer or any other machines that can run the software. Alternatively, the software may be obtained through a physical medium or distribution system, including, for example, from a server owned by the software creator or from a server not owned but used by the software creator. The software may be stored on a server for distribution over the Internet. Embodiments of the disclosure may be implemented as instructions stored on a computer-readable storage device or media, which may be read and executed by at least one processor to perform the methods described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, solid state storage media, and other storage devices and media.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a training unit/module, a calculating unit/module, a generating unit/module, a selecting unit/module, an applying unit/module, a determining unit/module, an updating unit/module, and instructing unit/module, an initializing unit/module, and/or a setting unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   initializing a neural network with a set of weight values, the neural network being used to determine actions that adjust one or more settings of cells associated with base stations in a wireless network, each base station providing communication services to user equipments (UEs) within one or more cells; and
   training the neural network by using a deep reinforcement learning (DRL) process, the DRL processing comprising:
      generating a first plurality of experience tuples for a plurality of cells in the wireless network, each experience tuple comprising a cell identifier that identifies a cell, a first state of the cell, a second state of the cell, an action that causes the cell to transit from the first state to the second state, and a reward value for taking the action, wherein a state of a cell comprises a setting of a base station providing a coverage area of the cell, and a reward value is calculated using a cost function based on measurement reports received from UEs in the wireless network, wherein each experience tuple can be a DRL-generated experience tuple in which a respective action is selected by a DRL agent based on the neural network according to a DRL technique or an expert-generated experience tuple in which the respective action is provided based on expert experience, and wherein whether an action is selected by the DRL agent based on the neural network or provided based on the expert experience is determined based on a first criterion; and
      selecting a second plurality of experience tuples from the first plurality of experience tuples; and
      updating the set of weight values of the neural network according to reward values in the second plurality of experience tuples.

2. The method of claim 1, wherein the first criterion is a probability based criterion, a similarity based criterion or a threshold based criterion.

3. The method of claim 1, wherein initializing the neural network with the set of weight values comprises:
   determining whether the neural network is initialized with randomly selected weight values or weight values obtained from an expert neural network, the expert neural network having been trained using a deep learning technique and being able to provide weight values for initializing the neural network.

4. The method of claim 1, wherein generating the first plurality of experience tuples further comprises:
   determining, based on the first criterion, whether an experience tuple is generated using an action that is selected by the DRL agent based on the neural network or whether the experience tuple is provided based on the expert experience.

5. The method of claim 1, wherein selecting the second plurality of experience tuples from the first plurality of experience tuples comprises:
   determining whether selecting a DRL-generated experience tuple or an expert-generated experience tuple from the first plurality of experience tuples based on a second criterion.

6. The method of claim 5, wherein the second criterion is a threshold based criterion, a probability based criterion, a similarity based criterion, a criterion based on relationship among experience tuples, or a criterion based on importance sampling.

7. A method comprising:
   training a neural network for a plurality of cells in a wireless network using a deep reinforcement learning (DRL) process for adjusting one or more cell parameters of cells associated with base stations in the wireless network, each base station providing communication services to user equipments (UEs) within a coverage area of one or more cells, and the neural network being trained to determine actions that can be performed on the base stations, wherein the DRL process comprises:

generating a plurality of experience tuples for a plurality of cells in the wireless network, comprising:
generating a state tensor for each of the plurality of cells, each state tensor indicating a state of a respective cell, wherein a state of a cell comprises a setting of a base station associated with the cell, the base station providing a coverage area of the cell;
selecting an action for each of the plurality of cells, the action moving the respective cell from one state to another state, wherein an action comprises information for adjusting a setting of a base station associated with a cell;
applying respective actions selected for the plurality of cells to the respective cells to adjust one or more cell parameters; and
generating an experience tuple for each of the plurality of cells based on the respective action applied, the experience tuple comprising a cell identifier identifying the respective cell, a first state of the respective cell that is indicated by a respective state tensor, a second state of the respective cell, the action applied to the respective cell that moves the respective cell from the first state to the second state, a local reward calculated for applying the action to the respective cell, and a global reward calculated for applying the action to the respective cell, the local reward being calculated based on a local cost function and the global reward being calculated based on a global cost function; and
determining whether or not an action of a first experience tuple in the plurality of experience tuples corresponding to a first cell is acceptable based on the local reward and the global reward of the first experience tuple; and
updating weights of the neural network based on whether or not the action is acceptable;
selecting an action for adjusting a cell parameter of a cell in the wireless network based on the trained neural network; and
instructing to adjust the cell parameter of the cell in the wireless network according to the selected action.

8. The method of claim 7, wherein a state tensor of a cell comprises at least a cell parameter of the cell and information obtained from a measurement report provided by a UE.

9. The method of claim 7, wherein a state tensor comprises information of inter-site distance (ISD), a height of a base station, an antenna azimuth, an antenna mechanical tilt (mTilt), an antenna electronic tilt (eTilt), a key performance indicator, reference signal received power (RSRP), reference signal received quality (RSRP), signal interference to noise ratio (SINR), channel quality indicator (CQI)), an objective function, a cumulative distribution function of network performance measurements, or an interference factor matrix.

10. The method of claim 7, wherein the one or more cell parameters comprises an engineer parameter of a base station associated with a cell.

11. The method of claim 7, wherein the DRL process further comprises selecting the plurality of cells from the wireless network based on a predefined criterion.

12. The method of claim 7, wherein selecting the action for each of the plurality of cells comprises selecting an action for a cell in the plurality of cells using the neural network based on the state tensor of the cell.

13. The method of claim 7, wherein selecting the action for each of the plurality of cells comprises selecting an action for a cell in the plurality of cells according to expert experience.

14. The method of claim 7, wherein determining whether or not the action of the first experience tuple in the plurality of experience tuples is acceptable comprises:
determining whether the global reward of the first experience tuple satisfies a first criterion;
when the global reward of the first experience tuple satisfies the first criterion, determining whether the local reward of the first experience tuple satisfies a second criterion; and
when the global reward of the first experience tuple satisfies the first criterion and the local reward of the first experience tuple satisfies the second criterion, determining that the action is acceptable.

15. The method of claim 14, further comprising determining that the action is not acceptable when the global reward of the first experience tuple does not satisfy the first criterion or the local reward of the first experience tuple does not satisfy the second criterion.

16. The method of claim 14, wherein determining whether the global reward of the first experience tuple satisfies the first criterion comprises:
determining that the global reward of the first experience tuple satisfies the first criterion when the global reward exceeds a first threshold.

17. The method of claim 16, wherein the first threshold is a best global reward value that has been obtained for the first cell.

18. The method of claim 14, wherein determining whether the global reward of the first experience tuple satisfies the first criterion comprises:
determining that the global reward of the first experience tuple does not satisfies the first criterion when the global reward is less than a second threshold.

19. The method of claim 18, wherein the second threshold is a best global reward value that has been obtained for the first cell.

20. The method of claim 14, wherein determining whether the local reward of the first experience tuple satisfies the second criterion comprises:
determining that the local reward of the first experience tuple satisfies the second criterion when the local reward exceeds a third threshold.

21. The method of claim 20, wherein the third threshold is an initial local reward value obtained for the first cell.

22. The method of claim 14, wherein determining whether the local reward of the first experience tuple satisfies the second criterion comprises:
determining that the local reward of the first experience tuple does not satisfy the second criterion when the local reward does not exceed a fourth threshold.

23. The method of claim 7, wherein updating the weights of the neural network based on whether or not the action is acceptable comprises:
applying a positive gradient when the action is acceptable; and applying a negative gradient when the action is not acceptable.

24. The method of claim 7, wherein the local reward and the global reward are calculated using information from different cells in the wireless network.

25. The method of claim 7, wherein the one or more cell parameters comprise an antenna tilt, an antenna azimuth, or an antenna transmission power.

26. An apparatus comprising:
a non-transitory memory storage comprising instructions; and
one or more processors in communication with the memory storage, wherein the one or more processors execute the instructions to:
train a neural network for a plurality of cells in a wireless network using a deep reinforcement learning (DRL) process for adjusting one or more cell parameters of cells associated with base stations in the wireless network, each base station providing communication services to user equipments (UEs) within a coverage area of one or more cells, and the neural network being trained to determine actions that can be performed on the base stations, wherein the DRL process comprises:
generating a plurality of experience tuples for a plurality of cells in the wireless network, comprising:
generating a state tensor for each of the plurality of cells, each state tensor indicating a state of the respective cell, wherein a state of a cell comprises a setting of a base station associated with the cell, the base station providing a coverage area of the cell;
selecting an action for each of the plurality of cells, the action moving the respective cell from one state to another state, wherein an action comprises information for adjusting a setting of a base station associated with the cell;
applying respective actions selected for the plurality of cells to the respective cells to adjust one or more cell parameters; and
generating an experience tuple for each of the plurality of cells based on the respective action applied, the experience tuple comprising a cell identifier identifying the respective cell, a first state of the respective cell that is indicated by a respective state tensor, a second state of the respective cell, the action applied to the respective cell that moves the respective cell from the first state to the second state, a local reward calculated for applying the action to the respective cell, and a global reward calculated for applying the action to the respective cell, the local reward being calculated based on a local cost function and the global reward being calculated based on a global cost function; and determining whether or not an action of a first experience tuple in the plurality of experience tuples corresponding to a first cell is acceptable based on the local reward and the global reward of the first experience tuple; and
updating weights of the neural network based on whether or not the action is acceptable; and
select an action for adjusting a cell parameter of a cell in the wireless network based on the trained neural network; and
instruct to adjust the cell parameter of the cell in the wireless network according to the selected action.

27. The apparatus of claim 26, wherein a state tensor of a cell comprises at least a cell parameter of the cell and information obtained from a measurement report provided by a UE.

28. The apparatus of claim 26, wherein a state tensor comprises information of inter-site distance (ISD), a height of a base station, an antenna azimuth, an antenna mechanical tilt (mTilt), an antenna electronic tilt (eTilt), a key performance indicator, reference signal received power (RSRP), reference signal received quality (RSRP), signal interference to noise ratio (SINR), channel quality indicator (CQI)), an objective function, a cumulative distribution function of network performance measurements, or an interference factor matrix.

29. The apparatus of claim 26, wherein selecting the action for each of the plurality of cells comprises selecting an action for a cell in the plurality of cells using the neural network based on the state tensor of the cell.

30. The apparatus of claim 26, wherein selecting the action for each of the plurality of cells comprises selecting an action for a cell in the plurality of cells according to expert experience.

31. The apparatus of claim 26, wherein determining whether or not the action of the first experience tuple in the plurality of experience tuples is acceptable comprises:
determining whether the global reward of the first experience tuple satisfies a first criterion;
when the global reward of the first experience tuple satisfies the first criterion, determining whether the local reward of the first experience tuple satisfies a second criterion; and
when the global reward of the first experience tuple satisfies the first criterion and the local reward of the first experience tuple satisfies the second criterion, determining that the action is acceptable.

32. The apparatus of claim 26, wherein updating the weights of the neural network based on whether or not the action is acceptable comprises:
applying a positive gradient when the action is acceptable; and
applying a negative gradient when the action is not acceptable.

* * * * *